(12) United States Patent
Yun et al.

(10) Patent No.: US 11,333,551 B2
(45) Date of Patent: May 17, 2022

(54) SYSTEM FOR PERFORMING SPECTROSCOPY

(71) Applicant: THE GENERAL HOSPITAL CORPORATION, Boston, MA (US)

(72) Inventors: Seok-Hyun Yun, Belmont, MA (US); Peng Shao, Boston, MA (US)

(73) Assignee: The General Hospital Corporation, Boston, MA (US)

( * ) Notice: Subject to any disclaimer, the term of this patent is extended or adjusted under 35 U.S.C. 154(b) by 766 days.

(21) Appl. No.: 16/077,189

(22) PCT Filed: Feb. 13, 2017

(86) PCT No.: PCT/US2017/017643
§ 371 (c)(1),
(2) Date: Aug. 10, 2018

(87) PCT Pub. No.: WO2017/139747
PCT Pub. Date: Aug. 17, 2017

(65) Prior Publication Data
US 2021/0181018 A1    Jun. 17, 2021

Related U.S. Application Data

(60) Provisional application No. 62/294,781, filed on Feb. 12, 2016.

(51) Int. Cl.
*G01J 3/45* (2006.01)
*G01J 3/02* (2006.01)
(Continued)

(52) U.S. Cl.
CPC .......... *G01J 3/0237* (2013.01); *G01J 3/0227* (2013.01); *G01J 3/0229* (2013.01); *G01J 3/26* (2013.01); *G01J 3/2823* (2013.01); *G01J 3/44* (2013.01)

(58) Field of Classification Search
CPC ...... G01J 3/0237; G01J 3/0227; G01J 3/0229; G01J 3/26; G01J 3/2823; G01J 3/44;
(Continued)

(56) References Cited

U.S. PATENT DOCUMENTS 3,729,261 A    4/1973  Riddle
5,172,383 A *  12/1992  Magill ................. H01S 5/0014
                                                        372/19
(Continued)

FOREIGN PATENT DOCUMENTS

CN    102299472        12/2011
JP    2001349781 A     12/2001
(Continued)

OTHER PUBLICATIONS

European Patent Office, Extended European Search Report for application 17750951.0, dated Sep. 19, 2019.
(Continued)

*Primary Examiner* — Tarifur R Chowdhury
*Assistant Examiner* — Jonathon Cook
(74) *Attorney, Agent, or Firm* — Quarles & Brady LLP

(57) ABSTRACT

A system for performing spectroscopy on a target is provided. In some aspects, the system includes an optical assembly that includes an optical source configured to generate light at one or more frequencies to be directed to a target. The optical assembly also includes at least one optical filter configured to select desired light signals coming from the target, wherein the at least one optical filter comprises an etalon and at least one reflecting surface external to the etalon, the at least one reflecting surface being configured to redirect to the etalon, at least once, an incident beam reflected from the etalon.

18 Claims, 23 Drawing Sheets

(51) Int. Cl.
*G01J 3/26* (2006.01)
*G01J 3/28* (2006.01)
*G01J 3/44* (2006.01)

(58) Field of Classification Search
CPC ... G01J 9/0246; G02B 5/284; G02B 6/29358; G02B 26/001
See application file for complete search history.

(56) References Cited

U.S. PATENT DOCUMENTS

| | | | |
|---|---|---|---|
| 5,666,225 | A | 9/1997 | Colbourne |
| 6,201,909 | B1 | 3/2001 | Kewitsch |
| 6,262,822 | B1 | 7/2001 | Obhi |
| 6,747,741 | B1 | 6/2004 | Kleinschmidt |
| 7,489,715 | B2 | 2/2009 | Hadrich |
| 2004/0120364 | A1 | 6/2004 | Koulikov |
| 2014/0368792 | A1 | 12/2014 | Friedman |

FOREIGN PATENT DOCUMENTS

| | | |
|---|---|---|
| WO | 2008137637 A2 | 11/2008 |
| WO | 2009134719 A2 | 11/2009 |

OTHER PUBLICATIONS

Japan Patent Office. Notification of Reasons for Refusal for application 2018-542285, dated Nov. 17, 2020. With translation. 7 pages.
China National Intellectual Property Administration; First Office Action for application 201780023319.8, dated Mar. 5, 2020. With translation.
Aharon, O. et al., "Liquid crystal Lyot tunable filter with extended free spectral range," Optics Express 17, 8 (2015).
Brillouin L.N., "Diffusion de la lumière et des rayons X par un corps transparent homogène; influence de l'agitation thermique," Ann. Phys. (Paris) 17, 88-122 (1922).
Carolan, P.G. et al., "A nanometer notch filter with high rejection and throughput," Review of Scientific Instruments 53, 5161 (1992).
Devlin G.E., "Absorption of Unshifted Scattered Light by a Molecular I2 Filter in Brillouin and Raman Scattering," Applied Physics Letters 19, 138 (1971).
Dil, J. G. "Brillouin scattering in condensed matter." Reports on Progress in Physics 45.3 (1982): 285.
International Searching Authority, International Search Report and written opinion for application PCT/US2017/017643, dated May 4, 2017.
Koski, K. J., et al. "Brillouin imaging." Applied Physics Letters 87.6 (2005): 061903.
Lyot B., "Optical apparatus with wide field using interference of polarized light," Comptes Rendus de l'Académie des Sciences 197 (1933).
Mckenzie, R. L. "Rayleigh rejection filters for 193-nm ArF laser Raman spectroscopy." Optics letters 18.12 (1993): 995-997.
Meng, Z. et al. "Background clean-up in Brillouin microspectroscopy of scattering medium." Optics express 22.5 (2014): 5410-5415.
Miller, C.M. et al, "Wavelength-locked, two-stage fiber Fabry-Perot filter for dense wavelength division demultiplexing in Erbium-doped fiber amplifier sepctrum," Electronics Letters 28, 2 (1993).
Owen, H., "The Impact of Volume Phase Holographic Filters and Gratings on the Development of Raman Instrumentation," Journal of Chemical Education 84, 6 (2007).
Scarcelli G. et al., "Confocal Brillouin microscopy for three-dimensional mechanical imaging," Nature photonics 2, 39-43 (2007).
Scarcelli, G. et al. "Multistage VIPA etalons for high-extinction parallel Brillouin spectroscopy." Optics express 19.11 (2011): 10913-10922.
Schoen, P. E., et al. "The iodine filter in Raman and Brillouin spectroscopy." Journal of Physics E: Scientific Instruments 5.6 (1972): 519.
Yoshino, T., et al. "Fiber-optic Fabry-Perot interferometer and its sensor applications." IEEE Transactions on Microwave Theory and Techniques 30.10 (1982): 1612-1621.
Israel Patent Office. Office Action for application 261121, dated Jun. 10, 2021. With machine translation. 6 pages.

* cited by examiner

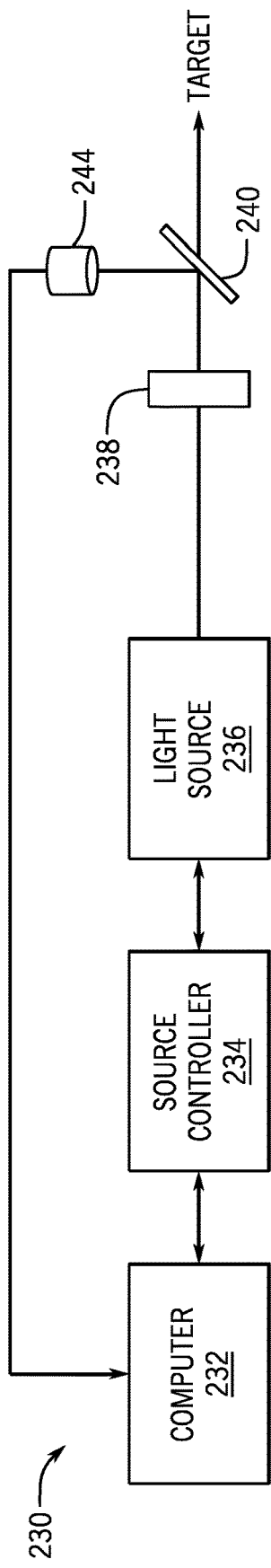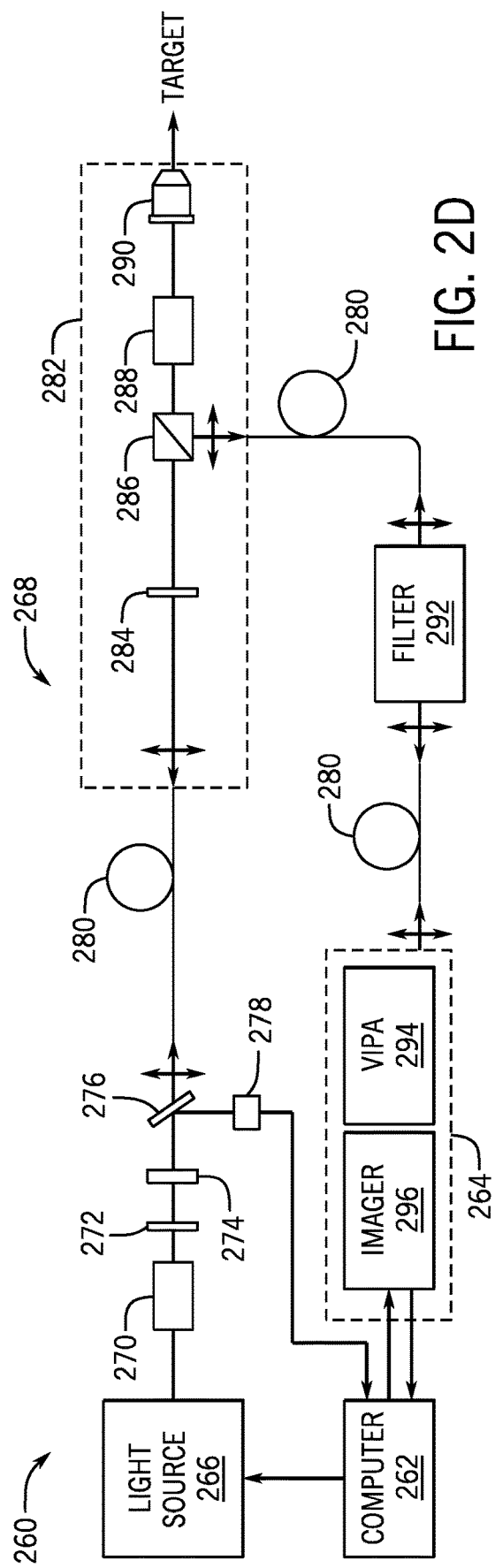

SYSTEM FOR PERFORMING SPECTROSCOPY

CROSS REFERENCE TO RELATED APPLICATIONS

This application is a U.S. National Stage of PCT Application No. PCT/US2017/017643 filed on Feb. 13, 2017 which is based on, claims priority to, and incorporates herein by reference in their entirety U.S. Ser. No. 62/294,781 filed Feb. 12, 2016, and entitled "ETALON FILTERS."

This application is based on, claims priority to, and incorporates herein by reference in their entirety U.S. Ser. No. 62/294,781 filed Feb. 12, 2016, and entitled "ETALON FILTERS."

BACKGROUND

The present disclosure relates generally to systems and methods for high-resolution spectroscopy, and in particular, to optical spectral filters.

Rejection of unwanted spectral components is often necessary in many optical applications, such as Raman scattering spectroscopy, laser fluorescence imaging, Brillouin scattering, and other scattering spectroscopy methods. In these techniques, it is beneficial to suppress or filter out unwanted spectral components, including elastic scattering from laser sources and optical components.

To do this, diffraction elements, such as diffraction gratings, are often used to spatially separate light signals. This allows selection of specific signals while blocking unwanted background signals. Another approach includes using spectral filters having differential transmissions or reflections between the background and desired signals. Conventionally, dielectric-stack filters are used as spectral filters. However, other types have also been used depending on the particular application. For example, holographic volume filters have been used in Raman scattering. Other filters used for laser line filtering have included organic absorbers and their solvents. In addition, Lyot filters, assembled from a sequence of birefringent crystalline plates, have also been used to reject certain wavelengths. Some Lyott-type filters can also have tunable transmission wavelength peaks when pocket cells are used instead of the passive birefringent crystals.

Generally, widths of the stopbands or edges of the above-described spectral filters range from a few nanometers to tens of nanometers. Although adequate for some implementations, such conventional filtering techniques are not sufficient for applications where the wavelengths or frequency shifts are very small. For example, in Brillouin scattering, wavelength shifts are usually less than 1 picometer, which is orders of magnitude less than the capabilities of conventional optical filters.

Since the 1970's, gaseous cells have been used as a notch filter in Raman scattering and Brillouin scattering to provide strong and sharp absorption lines. However, these have several intrinsic drawbacks. First, gaseous cells filters operate at specific wavelengths, and hence are limited in their applicability. This is because gaseous cell filters take advantage of the strong optical absorption of a certain gas in an enclosed capsule. Since the absorption spectrum of the gas is fixed, the filter can only work for specific wavelengths. Also, there are often multiple notches in the absorption spectrum of a gaseous cell. The interference between the notches and the desired signal can lead to undesired decreases of signal extinction. Furthermore, gaseous cells usually need to be heated to a high temperature to achieve high extinction, which brings about more complexity to the optical setup. For example, Iodine vapor used in a Brillouin micro-spectroscopy needs to be heated to 100° C. to reach an extinction of 50 dB.

Accordingly, there is a need for improved filtering to overcome the aforementioned difficulties.

SUMMARY

The present disclosure provides systems for spectroscopy that overcome the shortcomings of previous techniques. Features and advantages of the present disclosure will appear from the following description.

In accordance with one aspect of the disclosure, a system for performing spectroscopy on a target is provided. The system includes an optical assembly that includes an optical source configured to generate light at one or more frequencies to be directed to a target. The optical assembly also includes at least one optical filter configured to select desired light signals coming from the target, wherein the at least one optical filter comprises an etalon and at least one reflecting surface external to the etalon, the at least one reflecting surface being configured to redirect to the etalon, at least once, an incident beam reflected from the etalon.

In accordance with another aspect of the disclosure, an optical filter is provided. The optical filter is configured to select separate light signals from an incident beam, wherein the optical filter comprises an etalon and at least one reflecting surface external to the etalon, the at least one reflecting surface being configured to redirect to the etalon, at least once, a reflected beam from the etalon.

BRIEF DESCRIPTION OF THE DRAWINGS

Further objects, features and advantages of the present disclosure become apparent from the following detailed description taken in conjunction with the accompanying figures showing illustrative embodiments of the present invention, in which:

FIG. 2C shows yet another example system, in accordance with aspects of the present disclosure.

FIG. 2D shows yet another example system, in accordance with aspects of the present disclosure.

FIG. 9B shows another embodiment of FIG. 9A, in accordance with aspects of the present disclosure.

DETAILED DESCRIPTION

Many spectroscopy applications, such as Raman scattering and spectrometer-based Brillouin imaging, necessitate the rejection of the excitation light, stray light, and other background noise, while maintaining desired signals from a target. However, when the differences between desired and undesired signals are small, it is difficult to separate the signals. This is because the stopbands or edges of conventional optical filters are limited to roughly a few nanometers, whereas wavelength differences from some spectroscopy applications, like Brillouin scattering, can be on the order of 1 picometer, or less. As a result, confounding signals and noise cannot be eliminated with a high extinction ratio.

Therefore, the present disclosure provides systems for spectroscopy that can overcome the shortcomings of previous techniques. In particular, a novel filtering approach is herein introduced based on etalon filters that can produce filtering of desired signals with high fidelity, extinction ratio, and increased signal-to-background ratio ("SBR"). In particular, high-extinction Brillouin spectroscopy enables biomechanical imaging of biological samples, particularly nontransparent tissues such as the sclera, skin, vascular walls, and internal tissues. However, the present approach is pertinent to a wide range of applications necessitating optical filtering, such as multiplexing communication systems, as well as temperature applications, mechanical vibration applications, acoustic wave applications, voltage applications, magnetic field applications, and others.

Figure 1B:
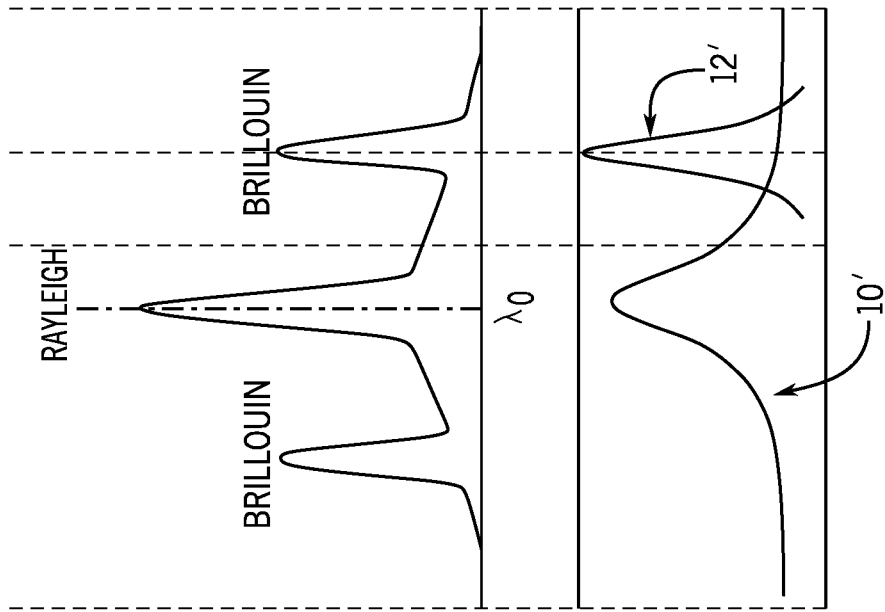
FIG. 1B is a conceptual diagraming a bandpass filter, in accordance with aspects of the present disclosure.
Figure 1A:
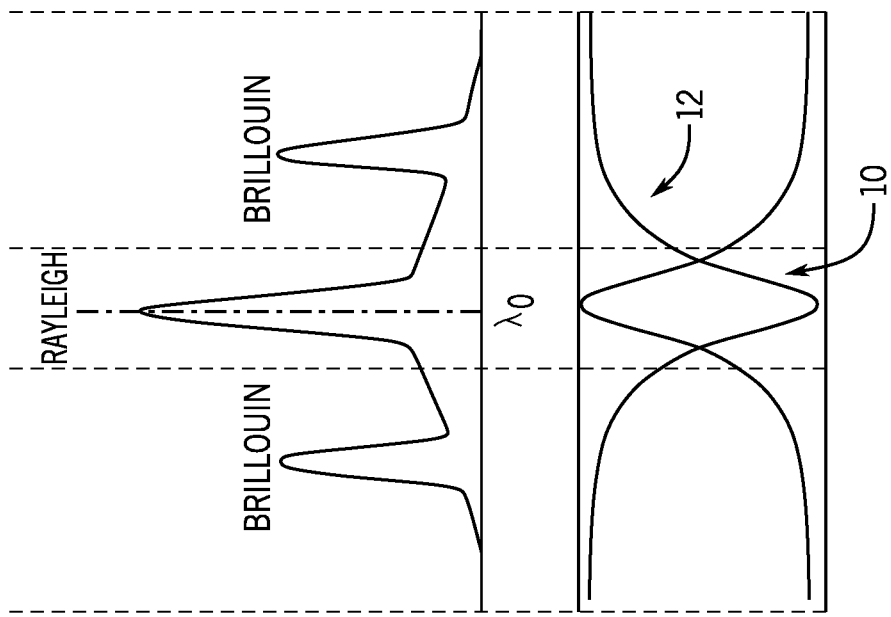
FIG. 1A is a conceptual diagram illustrating a notch filter, in accordance with the present disclosure.

In some aspects of the disclosure, a notch filter is provided. The notch filter may be formed using at least one etalon, as well as other optical elements, such as mirrors, lenses, and other components. In one embodiment of a notch filter, an incident beam reflected by an etalon may be redirected back to the etalon, for example using a mirror or reflecting surface, for a number of times. As will be described, this provides for a significantly improved rejection rate as compared to a stopband achieved using a single pass reflection from the etalon. As an example, FIG. 1A illustrates the concept of using a notch filter, in accordance with the present disclosure, to suppress signals in a portion of the spectrum, while allowing signals in other portions of the spectrum. In particular, application of the notch filter can produce a stop-band 10 for a laser line $\lambda_0$, and pass-bands 12 where desired signals are to be maintained. Alternatively, a notch filter may be configured to allow transmission of the laser line, while rejecting all other bands. It is envisioned that the provided notch filter may be used in applications where strong background noise suppression and signal extinction is advantageous, such as in Brillouin imaging, and Raman scattering imaging.

In other aspects of the disclosure, a bandpass filter is provided. The bandpass filter may be formed using at least one etalon, as well as other optical elements, such as mirrors, lenses, and other components. In one embodiment of a bandpass filter, an incident beam may traverse an etalon a number of times, the beam being reflected back and forth between two mirrors, or reflecting surfaces. As an example, FIG. 1B illustrates the concept of using a bandpass filter, in accordance with the present disclosure, to suppress signals in a portion of the spectrum, while allowing signals in other portions of the spectrum. In particular, application of the bandpass filter can produce a stop-band 10' that includes a laser line $\lambda_0$, and a passband 12' where desired signals are to be maintained. Alternatively, a bandpass filter may be configured to allow transmission of the band including laser line, while rejecting all other bands. In one envisioned application, bandpass filters, in accordance with aspects of the present disclosure, may be used to eliminate spontaneous emission noise from a light source. In addition, a provided bandpass filter can be used as a frequency-locking filter to stabilize the frequency of source laser.

Figure 2A:
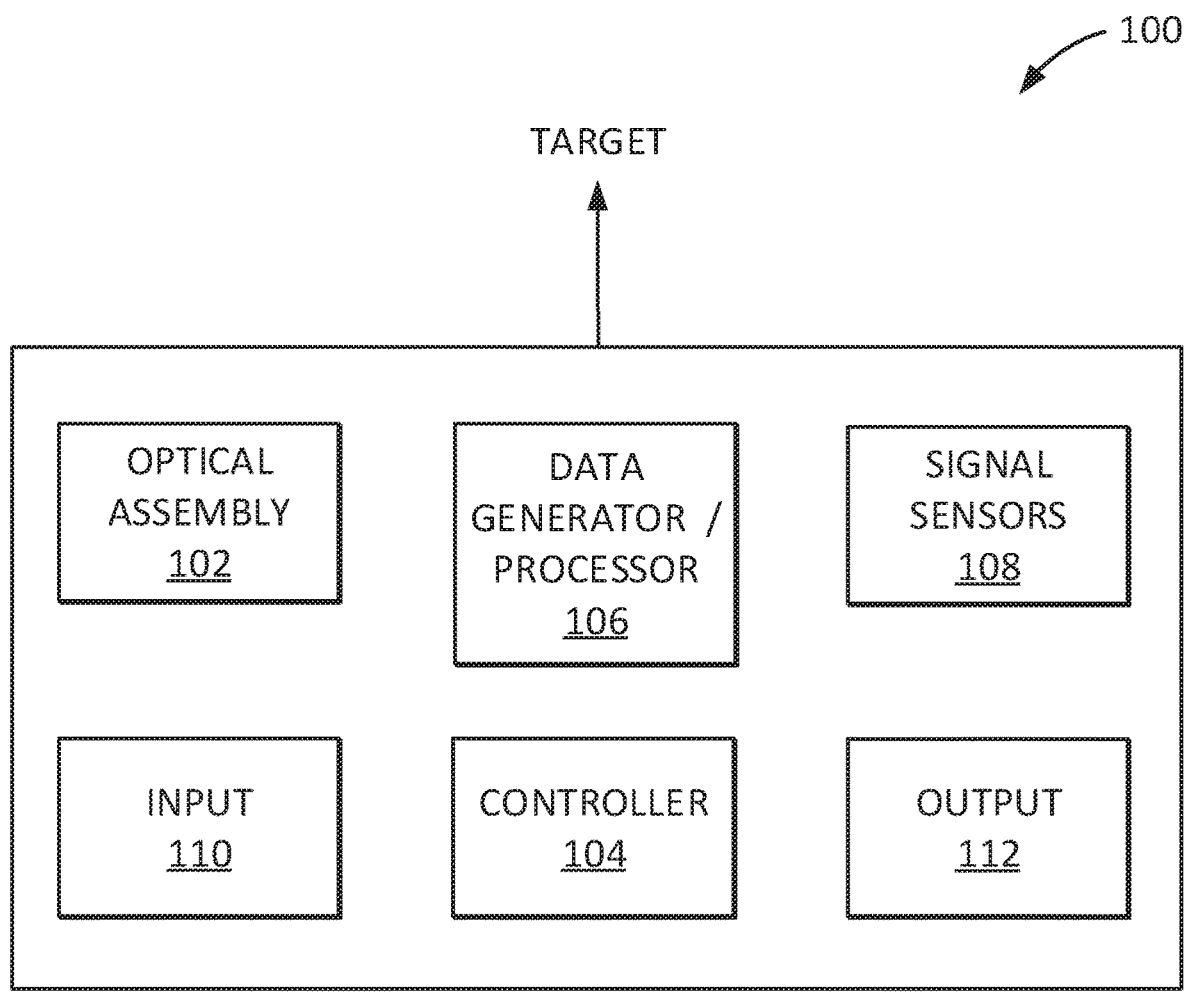
FIG. 2A shows an example system, in accordance with aspects of the present disclosure.

Turning to FIG. 2A, an example system 100, in accordance with aspects of the present disclosure, is shown. In general, the system 100 may include an optical assembly 102, a controller 104, a data generator and/or data processor 106, and one or more signal sensors 108, or any combination thereof. The system 100 may also include an input 110 for receiving input and operational instructions, as well as and an output 112 for providing a generated report. In some aspects, the system 100 may further include capabilities for rotating and translating various optical components, including motors, gears, movable stages and so forth. Various components of the system 100 may be included in a single housing or enclosure. Alternatively, a number of components of the system 100 may be housed separately, as independent or separate components or devices. In some aspects, the system 100 may be a spectroscopy system, as shown in the embodiments illustrated in FIGS. 2B-2D, as will be described.

The optical assembly 102 in FIG. 2A may include a variety of optical components and hardware, including various combinations of light sources, lenses, collimators, beam splitters, diffraction gratings, holograms, mirrors, optical isolators, single or multi-mode optical fibers, bundles, waveguides or optical couplings, as well as polarizers, shutters, filters, amplifiers, attenuators, filters, and so forth. In particular, the light sources may be configured to generate monochromatic, (single wavelength), multi-chromatic (multiple wavelengths) or broadband (a range of wavelengths) light signals. Non-limiting example light sources may include incandescent sources, fluorescent sources, light emitting diodes ("LEDs"), super luminescent LEDs, lasers, laser diodes, and other light sources. The light generated may be continuous-wave (steady), frequency or temporally modulated. For instance, the modulated light may be sinusoidally modulated, step modulated, triangularly modulated, arbitrarily modulated, or pulsed. As such, the light sources can operate in the continuous wave, frequency domain, and time domain.

In some aspects, the optical assembly 102 includes one or more etalons, forming one or more cleaning filters, notch filters and bandpass filter. An example etalon 300 is shown schematically in FIG. 3A. Specifically, the etalon 300 includes two semi-transparent surfaces 302 separated by air or a solid material with a thickness, d. A beam of light 304 with a wavelength $\lambda$ and incidence angle $\theta'$ on the etalon 300 undergoes multiple reflections, and can produce a number of reflected beams 306 and transmitted beams 308. During each bounce, the beam of light 304 undergoes a phase change $4\pi nd/\lambda$, where $\theta$ is the incident angle in the etalon and n is the refractive index. An interference of the reflected beams 306 and transmitted beams 308 results in a modulation of the incident beam 304. In particular, the transmission spectrum, T of the etalon 300 includes a series of resonance frequency peaks at which constructive interference takes place. The frequency spacing between peaks is the free spectrum range ("FSR"). When absorption and scattering losses are small, the reflection spectrum, R, is 1 minus the transmission spectrum, T, thus forms a series of stop bands.

In some embodiments, the FSR, the finesse, and the number of reflections may all be selected to improve performance. The rejection efficiency, or extinction, of an etalon is frequency dependent and is the maximum between resonance peaks; that is, at frequencies separated from the resonance frequencies by the half of the FSR. In the transmission mode, the Brillouin signal passes through the transmission peak of the etalon. Therefore, the FSR of the etalon is in some embodiments about equal to, or slightly greater than, the twice the Brillouin frequency shift of a sample. The reason why the FSR may be selected to be slightly greater than the half of FSR is because the higher FSR is, the broader the transmission peak becomes, and thus the wider is the usable frequency range for a Brillouin signal. In the reflection mode, the transmission peak of the etalon may be selected to coincide with the laser line, and high rejection efficiency would be desirable. In this case, the FSR of the etalon can be equal to twice the typical Brillouin frequency shift, although the FSR can be slightly higher than that as in the case of transmission mode.

In both modes, the finesse of etalon can also be selected to be within an optimal range. As finesse increases, the rejection efficiency increases but the width of the resonance peak decreases. Too sharp a resonance peak may not be desirable because this reduces the width of the usable Brillouin signal range in the transmission mode. In the reflection mode, a narrow resonance peak requires a stringent control of the etalon's transmission peak to align it to the laser line, although this difficulty can be circumvented by locking the laser wavelength to the etalon. Some embodiments use a moderate to low finesse, for example, less than 20 but greater than 5. Too low of a finesse (e.g., below about 5) may not be desirable because its rejection efficiency would be too low. When an etalon with moderate to low finesse is used, its single-pass rejection efficiency may not be high enough for certain applications. In this case, a multi-pass configuration is useful. The number of passes in both transmission and reflection modes are, in some embodiments, selected to be greater than 2 but less than 6 (i.e., with the range of 3 to 5). The low boundary comes from the need to have sufficient extinction. The upper boundary is due to increasing insertion loss of the Brillouin signal as the number of passes increases, which typically grows exponentially with the number of passes. At the same extinction level, the wider transmission band is obtained with multiple passes for an etalon with a low-to-moderate finesse than with a single-pass for an etalon with a high finesse (e.g., greater than 20).

Figure 3A:
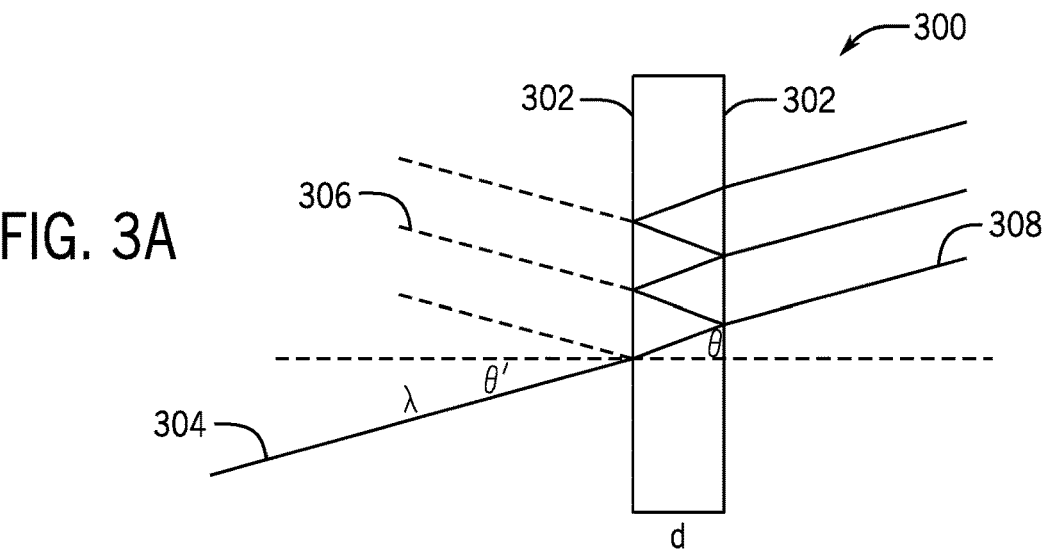
FIG. 3A is a schematic diagram illustrating an example etalon, in accordance with aspects of the present disclosure.
Figure 3B:
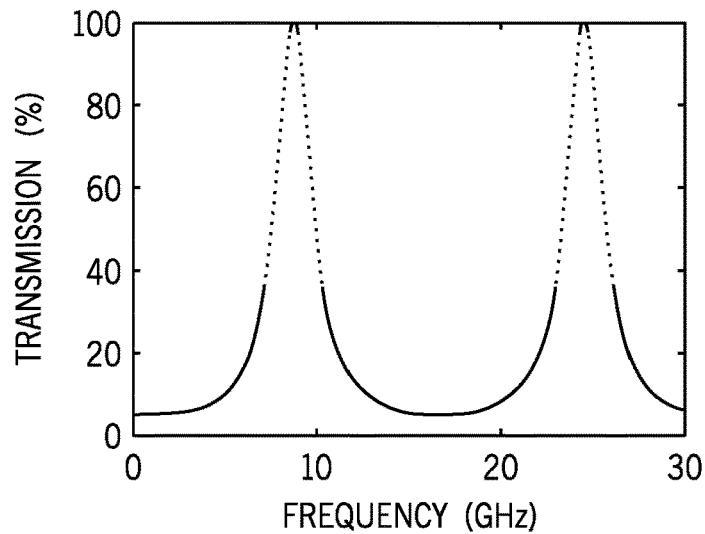
FIG. 3B is a graph showing measured transmission through the example etalon of FIG. 3A.
Figure 3C:
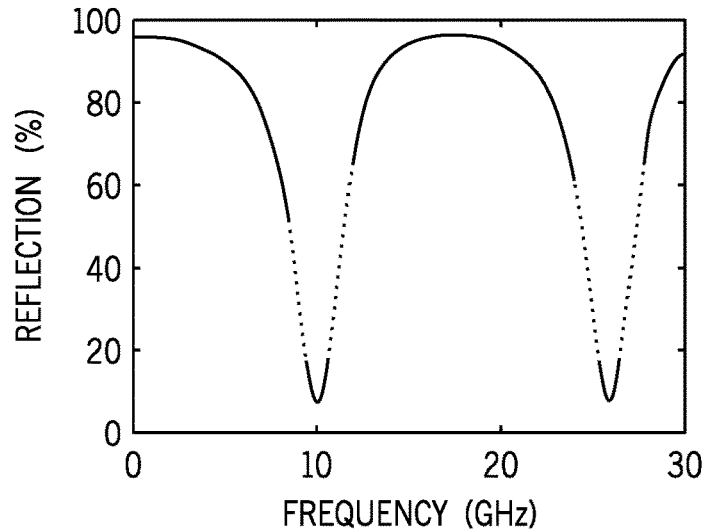
FIG. 3C is a graph showing measured reflection from the example etalon of FIG. 3A.

By way of example, FIGS. 3B and 3C depict exemplary transmission and reflection spectra obtained using an etalon, as described with reference to FIG. 3A. The etalon was made with a piece of fused silica with an area of 25 mm×25 mm and a thickness of about 6.4 mm, with a 2-nm root-mean-squared (RMS) thickness uniformity. The FSR was about 16 GHz. Reflectivity coatings on both sides were about 65% for a wavelength range of approximately 720 to 840 nm. The measured data were obtained with a 780-nm single wavelength laser with a beam diameter of around 2.8 mm. For this measurement, the optical frequency of the laser was modulated with an analog ramp voltage signal. The transmission profile was measured with a photodiode with a 30-dB dynamic range. The finesse of the etalon, referring to sharpness of transmitted peaks, was measured to be about 7. In the transmission mode, the maximum transmission was approximately 97% at resonance frequencies and the minimum was about 5.3% in between the resonance peaks, providing a rejection rate of about 11.9 dB. High optimal rejection rates can be obtained in a reflection mode although it is generally more challenging than the transmission mode, due to reasons such as optical absorption, flat defects and alignment errors. It is herein recognized that higher rejection rates may be obtained by cascading multiple stages of an etalon.

Referring again to FIG. 2A, the system 100 also includes a controller 104 that is configured to control the system 100. The controller 104 may be communication with, coordinate, and control various elements of the optical assembly 102, data generator or data processor 106 and signal sensors 108. The signal sensors 108 may include one or more optical detectors such as semiconductor photo diodes, PIN photodiodes, CCD and CMOS image sensors, photon-counting avalanche photodiodes ("APDs") and others. The data generator or data processor 106 may include various hardware and components for acquiring and/or processing optical, and other data. Although shown as separate components in FIG. 2A, the data generator or data processor 106 and signal sensors 108 may be combined into a single device or apparatus, such as a CCD camera or spectrometer, for example.

In some aspects, the controller 104 may be configured to control an alignment of the optical frequency of a light source and the resonance frequency of one or more of the clean filter, notch filter, or bandpass filter. This may be achieved either by controlling the optical frequency of the light source, or tuning the resonance frequency of the filter. In this manner, a pass-band may be matched to one or more desired lines of interest while rejecting other portions of a spectrum, for example.

Figure 4A:
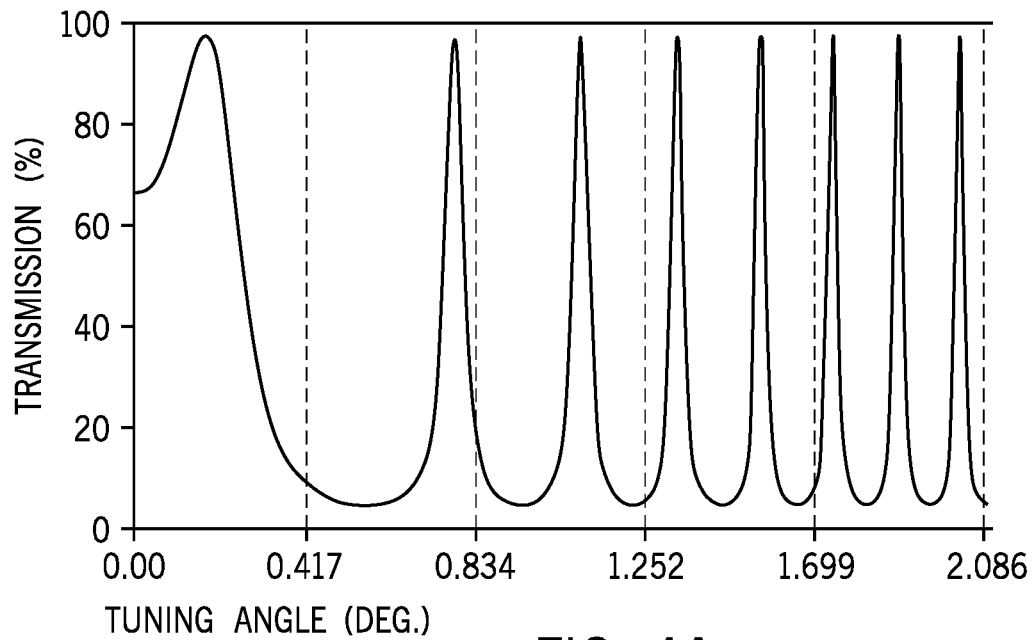
FIG. 4A is a graph showing transmission modulation of etalon by angle-tilting, in accordance with aspects of the present disclosure.
Figure 4B:
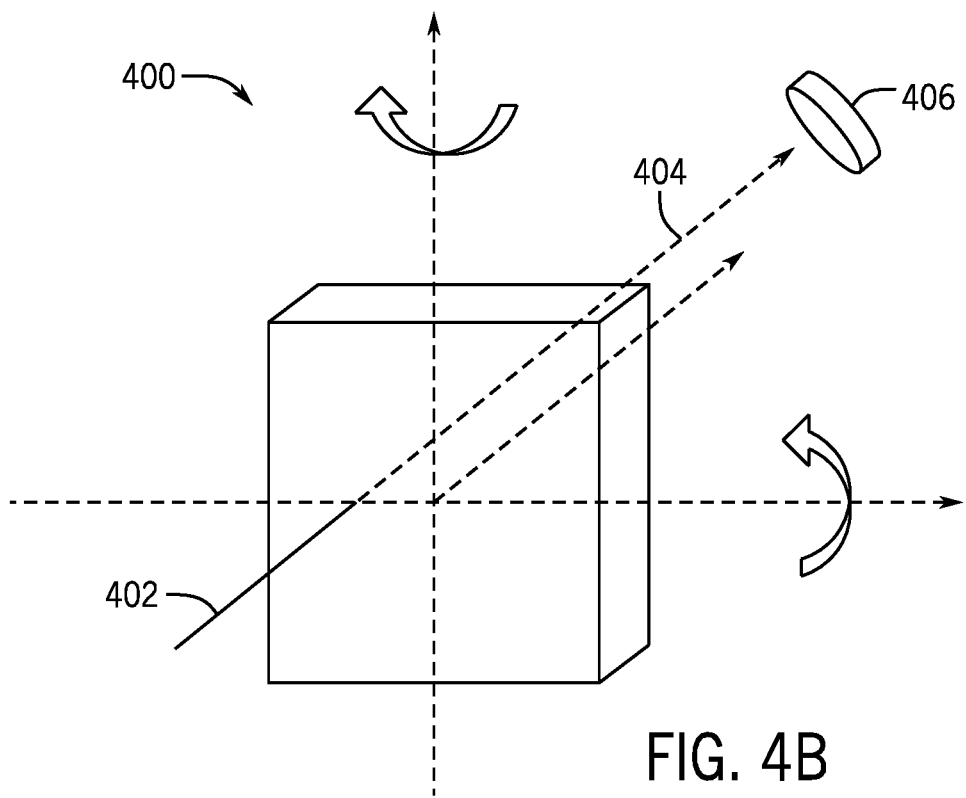
FIG. 4B is an illustration of etalon tuning by angle-tilting, in accordance with aspects of the present disclosure.

In some aspects, the controller 104 may be configured to control the transmission profile of one or more etalons. This may be achieved using a number of techniques, including angle tuning, temperature tuning, width tuning by piezoelectric techniques, and pressure tuning for air-gap etalons. As an example, FIGS. 4A and 4B depict transmission modulation of an etalon 400 due to angle tuning. For an incident beam 402 with an optical frequency, or wavelength, the power of the transmitted beam 404 received by a detector 406 can vary as a function of the tilt angle of the etalon, in one or more directions, as shown in FIG. 4B. In other words, the transmission resonance frequencies of the etalon are tuned as a function of the tilting angle, as shown in FIG. 4A.

Figure 5A:
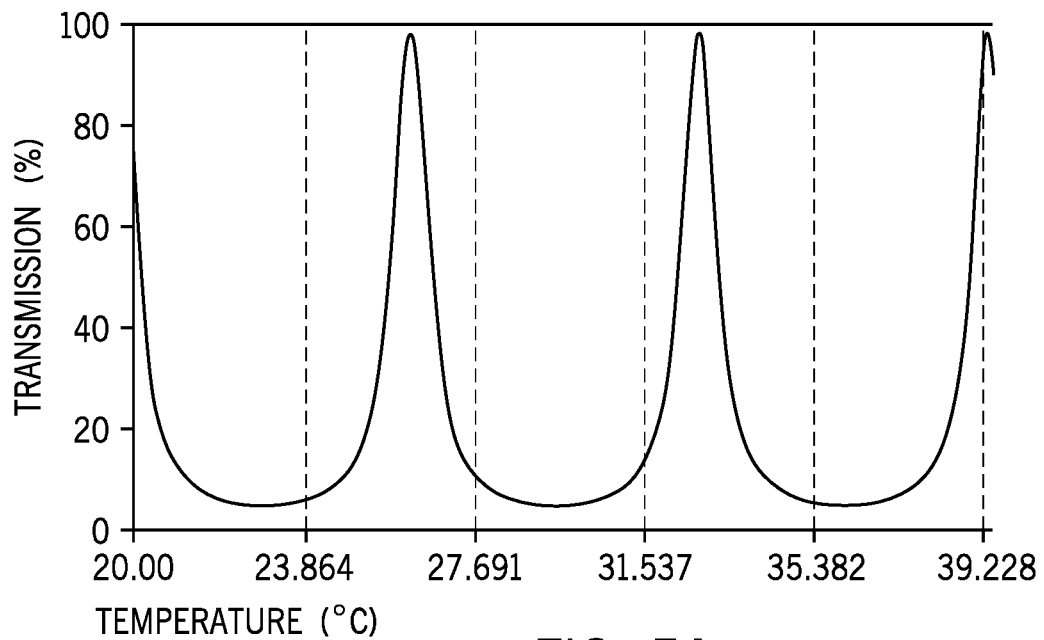
FIG. 5A is a graph showing transmission modulation of an etalon by temperature tuning, in accordance with aspects of the present disclosure.
Figure 5B:
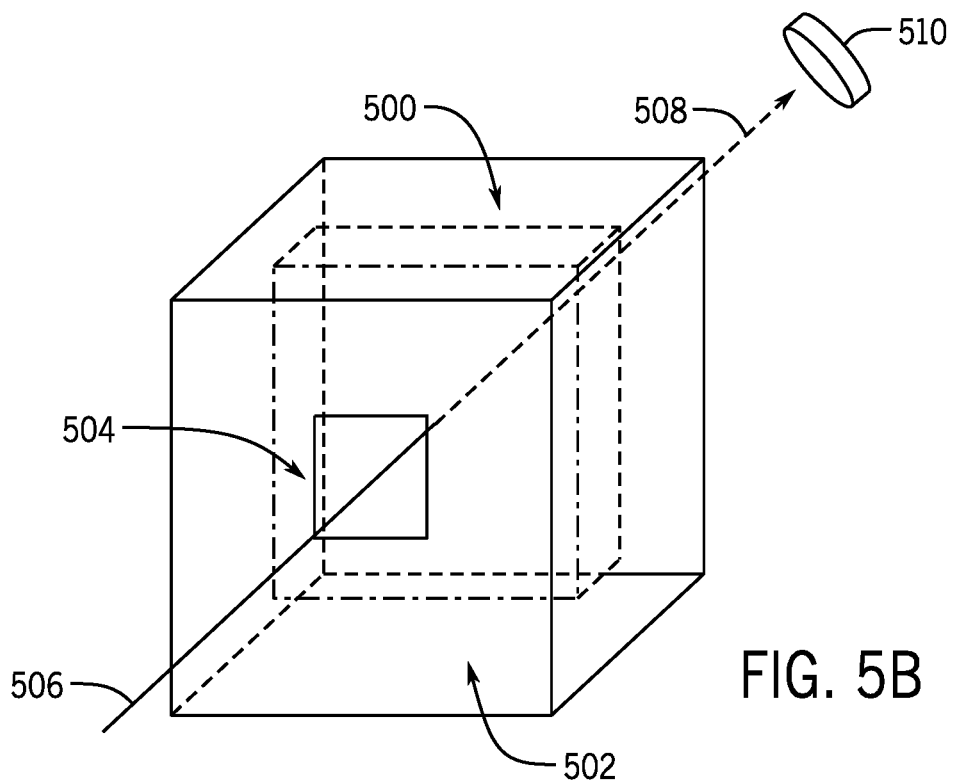
FIG. 5B is an illustration of etalon tuning using temperature, in accordance with aspects of the present disclosure.

As another example, FIGS. 5A and 5B depict transmission modulation of an etalon 500 due to temperature tuning. In particular, this technique may be used for either air-filed or solid-filed etalons. For solid-filed etalons, the range of tunability may depend on the material being used. The etalon 500 can be positioned in a heat-resistant enclosure 502 having temperature controlling capabilities, for example inside the enclosure 502. At least one window 504 formed in the enclosure 502 allows an incident beam 506 to enter and a transmitted beam 508 to exit the enclosure 502 and be received by a detector 510, as shown in FIG. 5B. Temperature tuning profiles or transmission resonance profiles can be generated by measuring the power of transmitted light normalized to the input power as function of temperature, as shown in FIG. 5A.

Figure 2B:
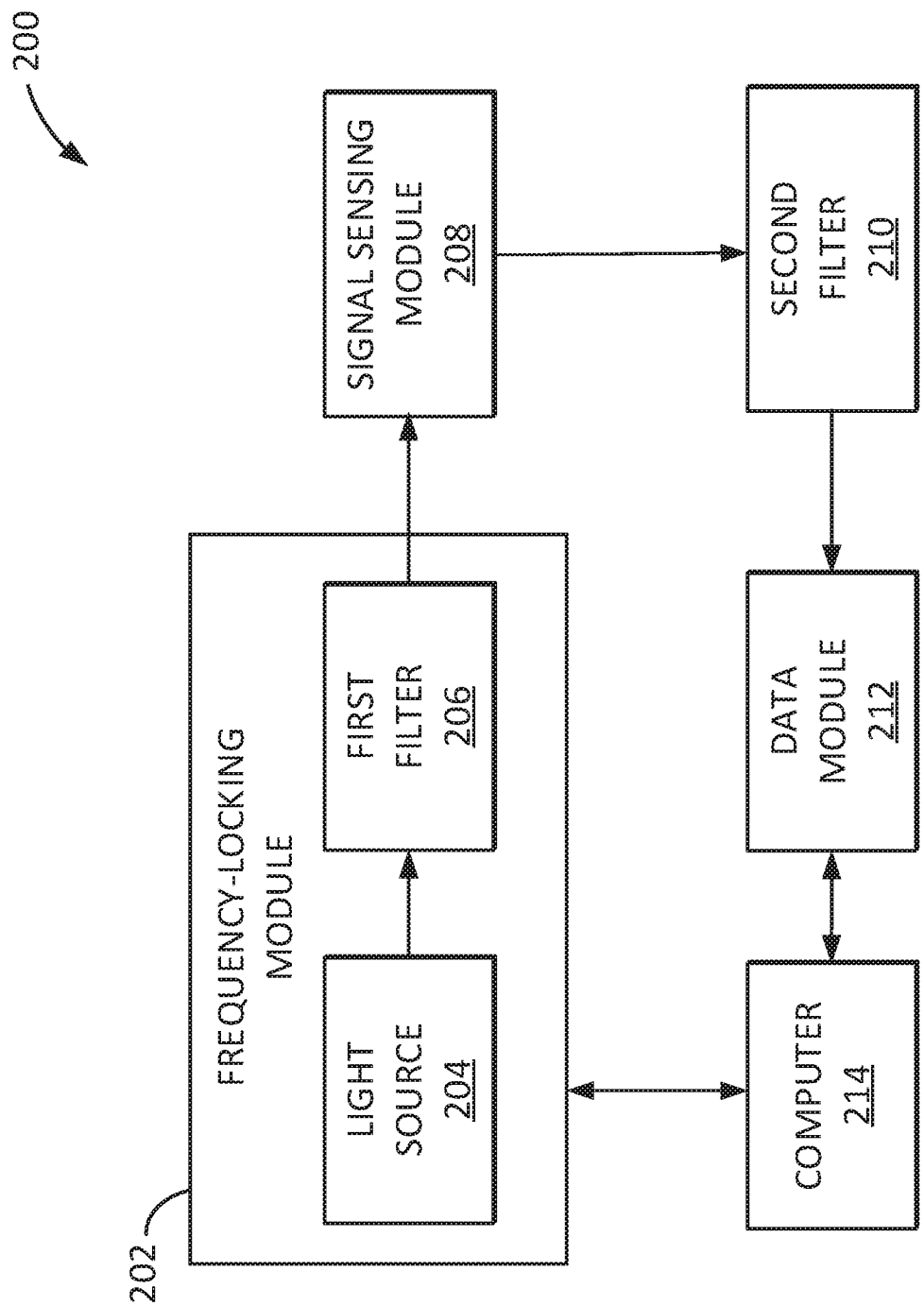
FIG. 2B shows another example system, in accordance with aspects of the present disclosure.

Turning now to FIG. 2B one embodiment of a system 200, in accordance with present disclosure, is shown. The system 200 includes a frequency-locking module 202, including a light source 204 and a first filter 206, as well as a signal-sensing module 208, a second filter module 210, a data module 212, and a computer 214, as shown. In one aspect, the first filter 206 in the frequency-locking module 202 may be a frequency-locking or cleanup filter, in the form of a bandpass filter based on etalons, as described. Light produced by the light source 204, for example, as laser light, would then enter the first filter 206, which then selects specific wavelengths or frequencies while rejecting undesired ones. In some aspects, the central frequency (or wavelength) of the light may be locked to a transmission peak of the second filter 210, using software or programming carried out by the computer 214. The locking scheme stabilizes laser output, and can guarantee proper operation or filtering by the second filter 210.

As shown, signals received by the signal sensing module 208 are then directed to a second filter 210. In some aspects, the second filter 210 may include bandpass filter, a bandstop filter or a notch filter based on etalons, in accordance with aspects of the present disclosure. As mentioned, in some aspects, the second filter 210 may be matched or locked to the first filter 206. Signals filtered by the second filter 210 may then be acquired by the data module 212 and further processed. The computer 214 may then obtain raw and or processed data from the data module 212 and generate a report.

Figure 6:
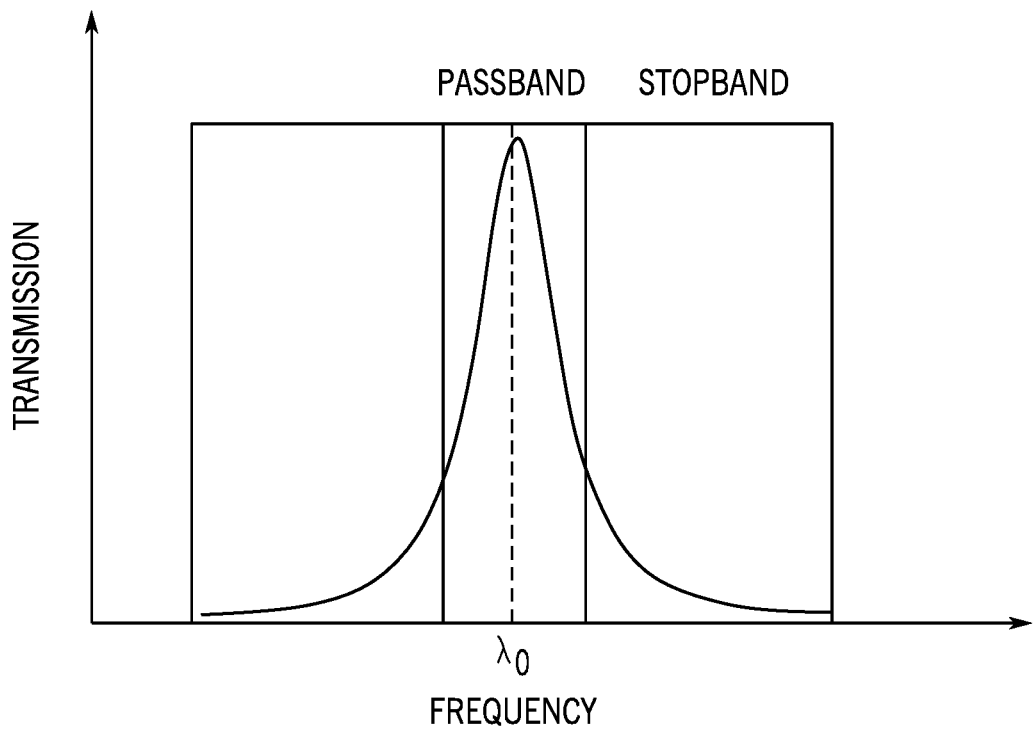
FIG. 6 is a schematic showing an example profile of the laser frequency-locking (clean-up) filter, in accordance with aspects of the present disclosure.

In some implementations, the system 200 may be used for applications where a high extinction ratio of the laser line to background noise is critical, such as Brillouin microscopy. Typically an extinction ratio greater than 80 dB, when measured with a bandwidth of 100-500 MHz, may be desired. For highly scattering samples, an extinction ratio greater than 100 dB may be desired. As an example, FIG. 6 shows a schematic profile of a laser frequency-locking or clean-up filter. As a bandpass filter, the profile includes a central passband, and stopbands on the two sides of the central peak $\lambda_0$. This filter can suppress side-modes of a laser's spectrum, and hence may be used to stabilize the output frequency or wavelength the light, which can locked to the transmission peak of a second filter.

A cleanup bandpass filter with a profile such as the one shown in FIG. 6 may be employed to suppress the spontaneous emission background and spurious side-modes in the laser output, for example. This filter may be critical, especially when a semiconductor laser is used as the laser source, which typically has a relatively high spontaneous noise background. The typical laser-to-spontaneous noise ratio, as measured by a typical spectrometer, is −50 to −55 dB. When imaging highly scattering tissues, such as the sclera, a finite amount of the laser output, consisting of both the laser line and background, is elastically scattered. While the laser line can be suppressed by a filter and VIPA etalons, the broadband spontaneous emission background in the Brillouin frequency range cannot be suppressed without losing the magnitude of the Brillouin signal because they occupy the same frequency. The cleanup filter placed before the sample is useful in some embodiments because it suppresses the background noise at the Brillouin frequency band before it is scattered from the sample. Such an arrangement to achieve a sufficiently high laser-to-background ratio, typically greater than 65 dB, at the Brillouin frequency range is useful for imaging tissues with high scattering-induced back reflection, such as the sclera. The transmission of the clean-up filter is aligned to both the laser line and the high-rejection peak of the transmission or reflection filter. Examples of the type of cleanup filter that may be used include: an etalon, a diffraction grating, and gas absorption filter. An etalon clean-up filter may have a finesse in the range of 5 to 20, for example. The FSR may be selected to be approximately twice, or modestly larger than, the Brillouin frequency shift. The Brillouin system may employ both a laser cleanup filter and a reflection-mode notch etalon filter in conjunction with a 2-stage VIPA spectrometer. Embodiments of such as system have enabled Brillouin imaging of highly scattering ocular tissues in the sclera, which has previously not been possible.

Turning to FIG. 2C, one embodiment of an active frequency-locking system 230, in accordance with aspects of the present disclosure, is shown. The system 230 may include a computer 232 in communication with a source controller 234, a light source 236 controlled by the source controller 234. The light source 236 may be a laser, or other tunable optical source. In one non-limiting example, the laser may be a diode laser or semiconductor laser. The system 230 may also include a frequency-locking filter 238, a beam sampler 240, and a detector 244. A light beam generated by the light source 236 passes the frequency-locking filter 238 and impinges on the beam sampler 240. One portion of the light beam (for example less than 5%) may be reflected towards the detector 244, while another portion may be directed to a target, such as a sample or tissue. The detector 244 may be a photodetector and be configured to provide a feedback signal, for example in the form of an analog signal, to the computer 232.

The frequency of the output of the light source 236 may be continuously tuned using the source controller 234, as directed by the computer 232, for example, to achieve near-maximal power throughput. The output may also be locked to the frequency corresponding to the transmission peak of an etalon based filter, as described. Tuning of the frequency can be accomplished by providing an analog voltage input to the source controller 234, with an input resolution of approximately 1 mV and tuning resolution of approximately 10 MHz, for example. By actively maintaining the transmission through the frequency-locking filter 238 by greater than 98% of the peak transmission, a frequency locking stability of less than 20 MHz is achieved.

Figure 7:
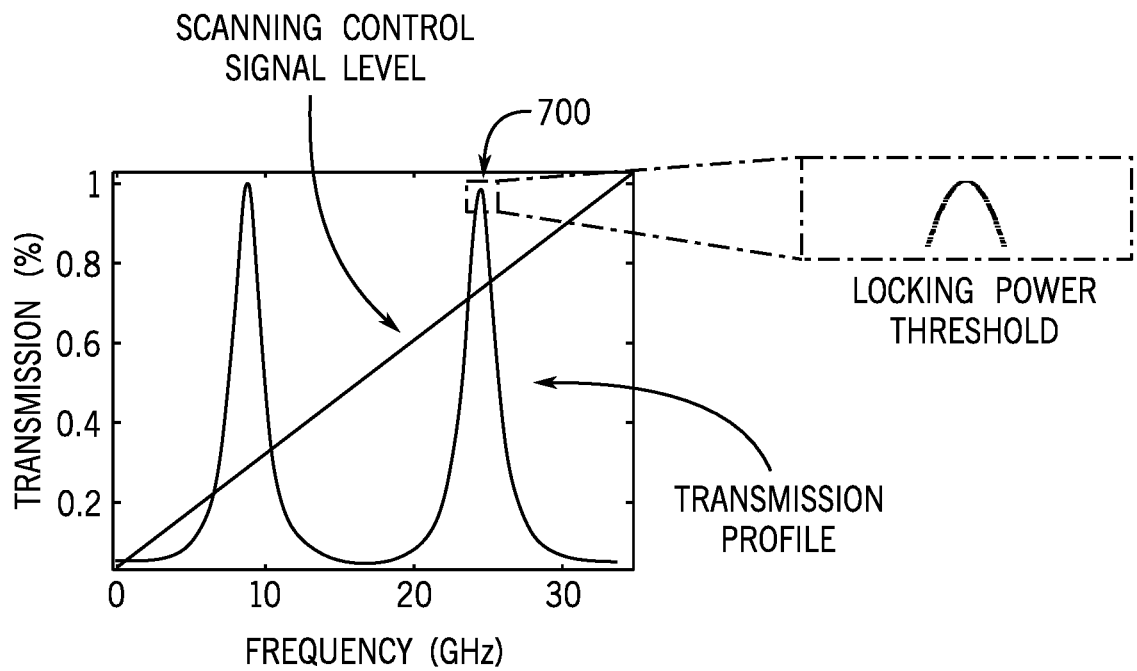
FIG. 7 is a graph illustrating an active frequency-locking scheme with a clean-up filter, in accordance with aspects of the present disclosure.

Such frequency-locking scheme is illustrated in FIG. 7. Using a frequency tunable laser system, for example, the output can be modulated to scan over a frequency range consistent with at least one transmission peak 700 of an etalon, for example. The frequency of the output can then be locked within a narrow frequency range by actively modulating or dithering the frequency to maintain a transmission power through the filter relative to a pre-determined threshold. As an example, such threshold may be above 90% power transmission, or more specifically, about 95% power transmission.

Referring now to FIG. 2D, another example of a system 260, in accordance with aspects of the present disclosure, is shown. The system 260 includes a computer 262, a data module 264, a light source 266, and an optical assembly 268. As described, the light source 266 may include a laser, such as a diode laser. In particular, the optical assembly 268 includes a first optical isolator 270, a first half-wavelength wave plate 272, a first filter 274, a beam splitter 276 and a photodetector 278. As described above, the photodetector 278 may be used to provide feedback for achieving frequency-locking using the computer 262 and light source 266. In particular, an output frequency or wavelength of the optical source 266 may be tuned and locked to the center frequency or wavelength of the first filter 276, which may be a bandpass filter based on an etalon, in accordance with the present disclosure.

Figure 9A:
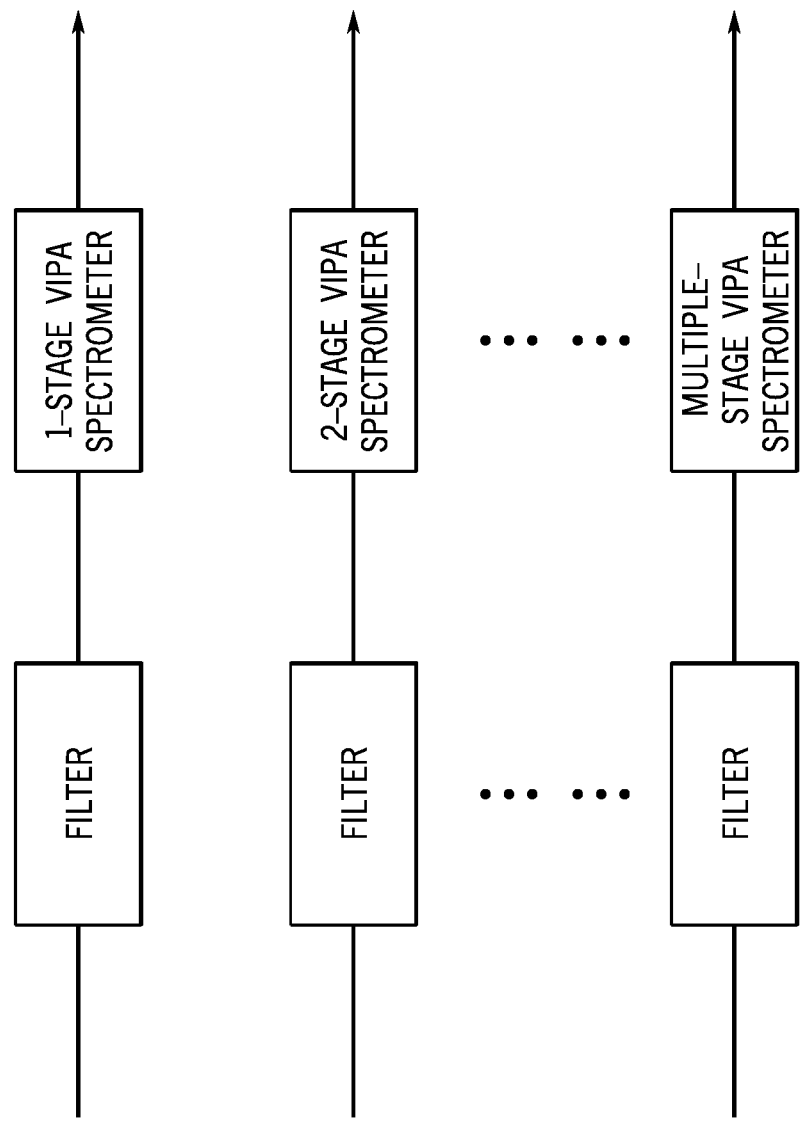
FIG. 9A shows examples of filters combined with single or multi-stage virtually imaged phased array (VIPA)-based spectrometers, in accordance with aspects of the present disclosure.
Figure 9B:
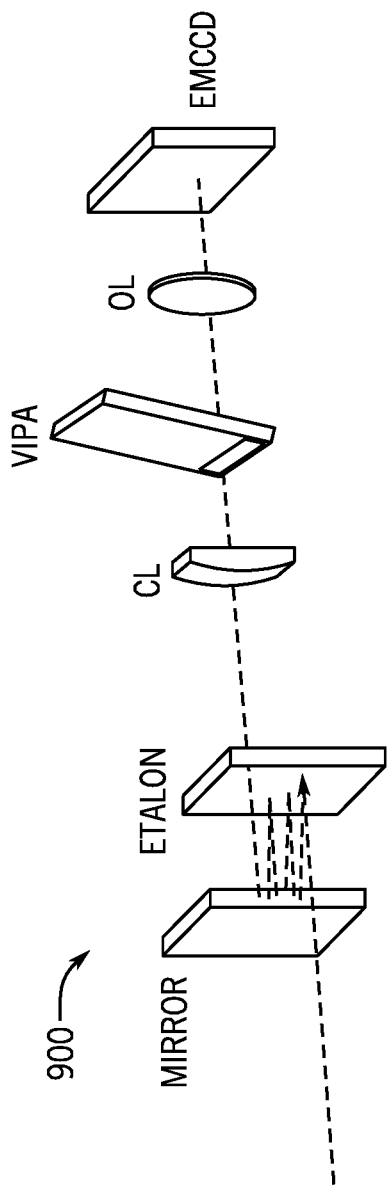
FIG. 9B shows one embodiment of FIG. 9A, in accordance with aspects of the present disclosure.
Figure 9C:
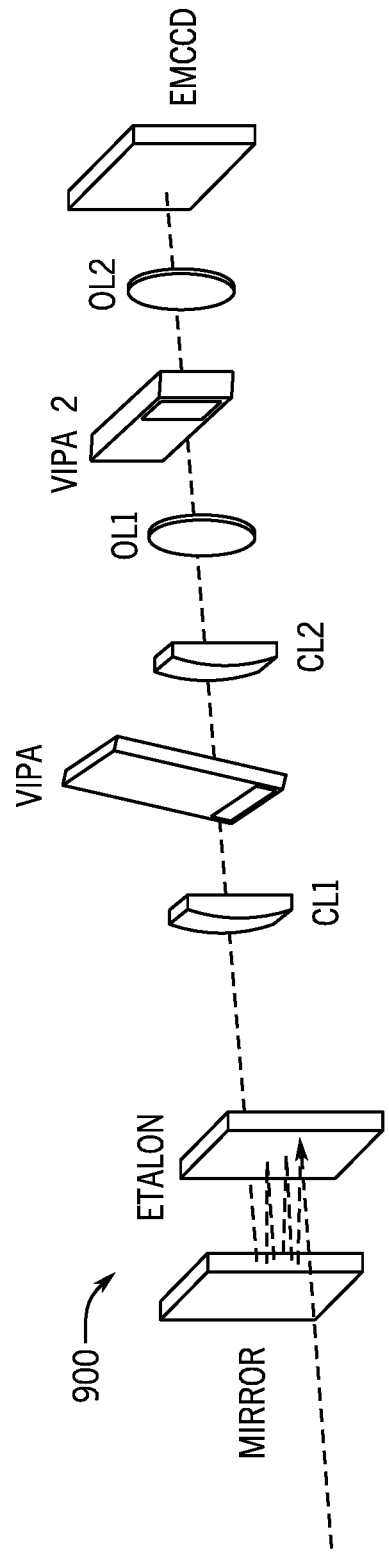

The optical assembly 268 also includes a number of optical fibers 280 connecting various optical elements of the optical assembly 268. The optical assembly also includes an experimental interface 282, which may be motorized. The experimental interface 282 may include a second half-wavelength wave plate 284, a polarization beam splitter 286, a second optical isolator 288, and an objective lens 290. As shown, signals from the experimental interface 282 may be directed to a second filter 292 via optical fibers 280. In one example, the second filter 292 may be a notch filter, in accordance with the present disclosure. Filtered signals from the second filter 292 may then be directed and processed by the data module 264. As shown, the data module 264 can include a virtually imaged phased array ("VIPA") 294 and an imager 296, which may be a CCD camera, for example. The VIPA 294 be a single- or multi-stage VIPA spectrometer, as shown in the examples of FIGS. 9A-9C.

Figure 8A:
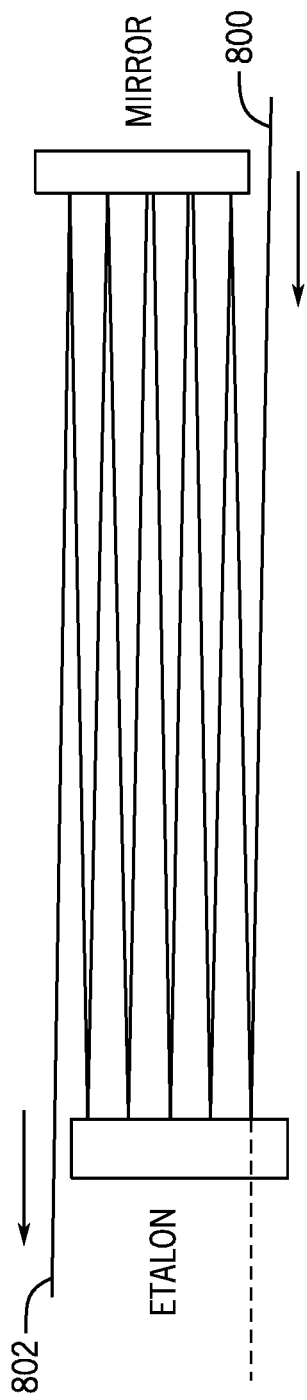
FIG. 8A shows one example of a notch filter, in accordance with aspects of the present disclosure.
Figure 8B:
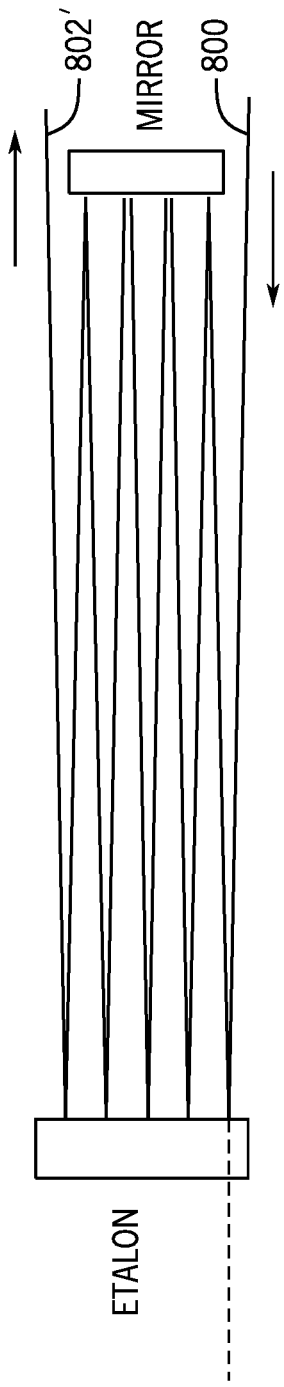
FIG. 8B shows another example of a notch filter, in accordance with aspects of the present disclosure.
Figure 8C:
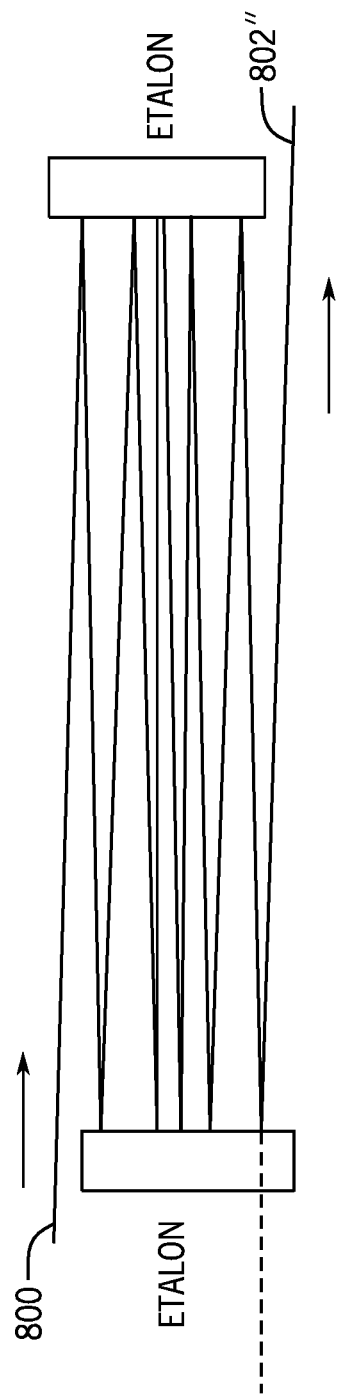
FIG. 8C shows yet another example of a notch filter, in accordance with aspects of the present disclosure.

In accordance with aspects of the present disclosure, FIGS. 8A-8H depict various embodiments of filters. Referring particularly to FIGS. 8A-C, different variations of a notch filter, with multiple reflections, are shown. Specifically, FIGS. 8A and 8B show a configuration that includes one etalon and one mirror external to the etalon. An beam incident reflected from an etalon is redirected back to the etalon a number of times by the mirror, or other reflecting surface. The number of reflections and direction of the outgoing beam may be determined by the sizes and relative positions of the etalon and mirror. For instance, in FIG. 8A, the number of reflections, size and position of the mirror (shifted vertically relative to the etalon) result in the outgoing beam 802 to be in the same direction as the incident beam 800. By contrast, in FIG. 8B, the outgoing beam 802' is in the opposite direction of the incident beam 800. The etalon and the mirror may be carefully aligned with an etalon angle-tuning technique to achieve multiple reflections with substantially identical incident angle of the beam on the etalon. In one variation of a notch filter, shown in FIG. 8C, two substantially parallel etalons may be utilized. An incident beam 800 directed to a first etalon is reflected to the second etalon, and so forth, for a number of times. As shown in FIGS. 8A-8C, the incident beam 800 is oriented at an angle, for example, less than 10 degrees, for example, relative to a surface of an etalon.

Notch filters, as described, can provide a significantly improved rejection rate as compared to a stopband achieved using a single pass reflection from the etalon. In principle, the rejection efficiency or extinction ratio can increase with the number of etalons and number of reflections. For example, if the extinction of one reflection profile is 10 dB, up to 20 dB can be achieved for two reflections, 30 dB for three reflections, and so on. In practice, errors due alignment, losses caused absorption, beam shape deformation can accumulate with each additional reflection, and as such would need to be considered in selecting the particular configuration and number of beam reflections in the notch filter.

Notch filters, as described, may be used in a variety of applications. For example, FIGS. 9A and 9B show optical assemblies combining a notch filter, based on an etalon and mirror, and a one-stage or two-stage VIPA spectrometer. Specifically, the optical assembly of FIG. 9A shows a notch filter 900, a collimating lens ("CL"), a virtually imaged phased array ("VIPA"), an objective lens ("OL"), and an imager ("EMCCD"). The optical assembly of FIG. 9B shows the notch filter 900, a first collimating lens ("CL1"), a first virtually imaged phased array ("VIPA 1"), a second collimating lens ("OL2"), a first objective lens ("OL1") a second virtually imaged phased array ("VIPA 2"), a second objective lens ("OL2"), and an imager ("EMCCD").

Figure 8D:
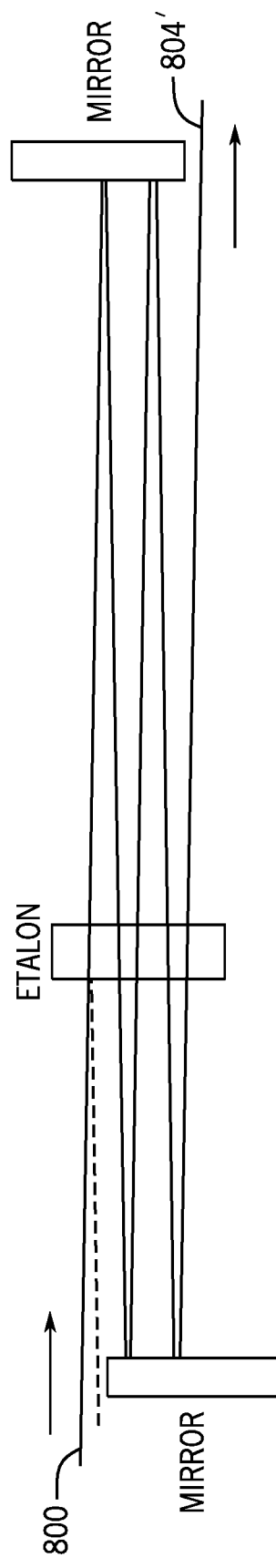
FIG. 8D shows one example of a bandpass filter, in accordance with aspects of the present disclosure.
Figure 8E:
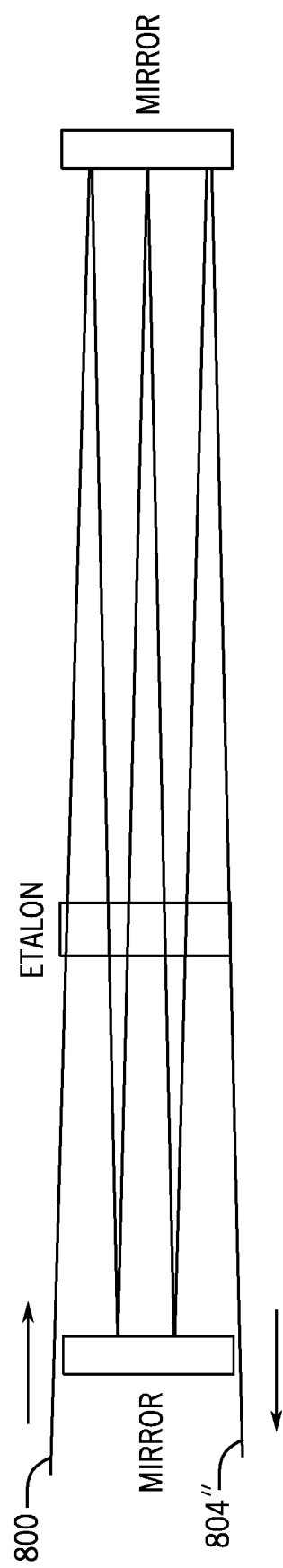
FIG. 8E shows another example of a bandpass filter, in accordance with aspects of the present disclosure.
Figure 8F:
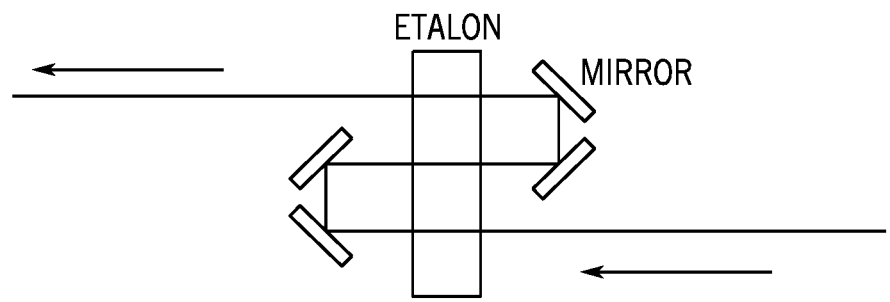
FIG. 8F shows yet another example of a bandpass filter, in accordance with aspects of the present disclosure.
Figure 8G:
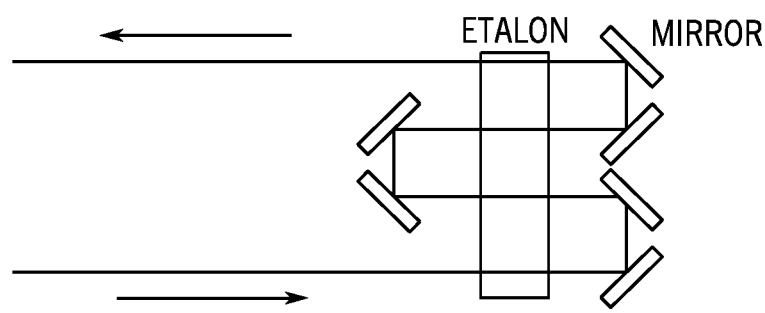
FIG. 8H shows yet another example of a bandpass filter, in accordance with aspects of the present disclosure.

Referring particularly to FIGS. 8D-8E, different variations of a bandpass filter, with multiple transmissions, are shown. Specifically, in FIGS. 8D and 8E, an incident beam 800 is transmitted through an etalon multiple times using two mirrors external to, and substantially parallel, to the etalon. Depending upon the size and relative position of the etalon and mirrors, the direction of the transmitted beam may be in the same direction (outgoing beam 804' in FIG. 8D) or in the opposite direction (outgoing beam 804" in FIG. 8E) to the incident beam 800. Multiplication of transmission profile due to each pass or transmission through an etalon can lead to high extinction.

Figure 8H:
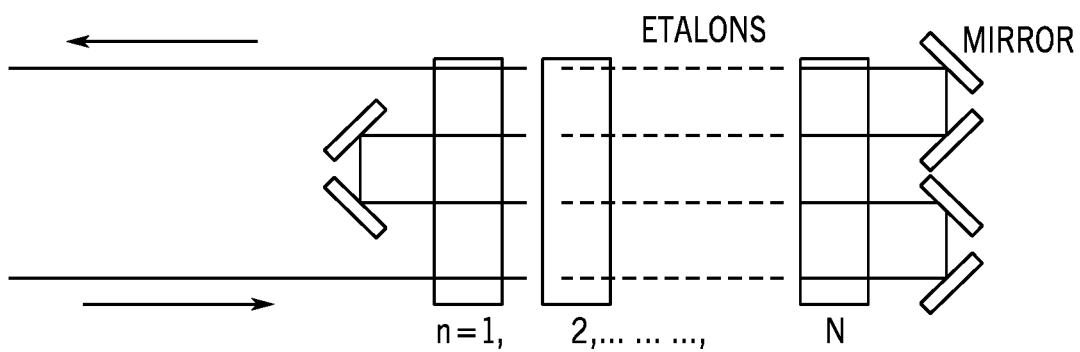

As shown, the angle of the incident beam 800 on the etalon in FIGS. 8E and 8D is non-zero. In some variations, shown in FIGS. 8F and 8G, the angle of incidence can be substantially zero. To this end, more than two mirrors or reflecting surfaces may be used. In some embodiments, a number of etalons and mirrors may be utilized, as shown in FIG. 8H.

Figure 10A:
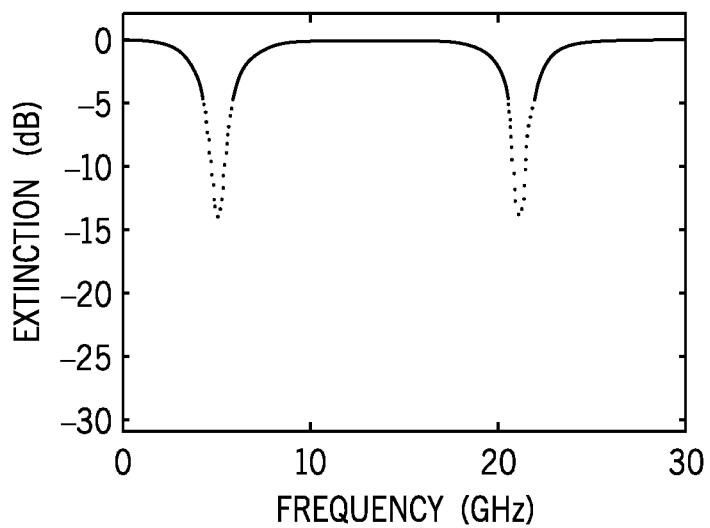
FIG. 10A is a graph showing measured extinction profiles using one reflection from an etalon, in accordance with aspects of the present disclosure.
Figure 10B:
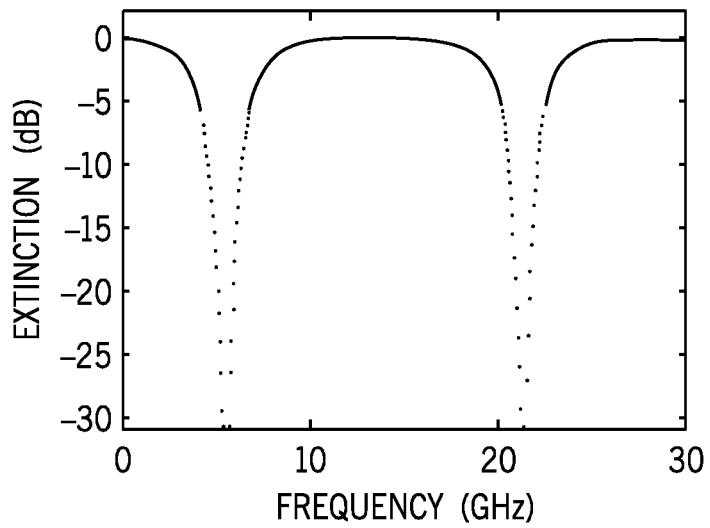
FIG. 10B is a graph showing measured extinction profiles using two reflections from an etalon, in accordance with aspects of the present disclosure.
Figure 10C:
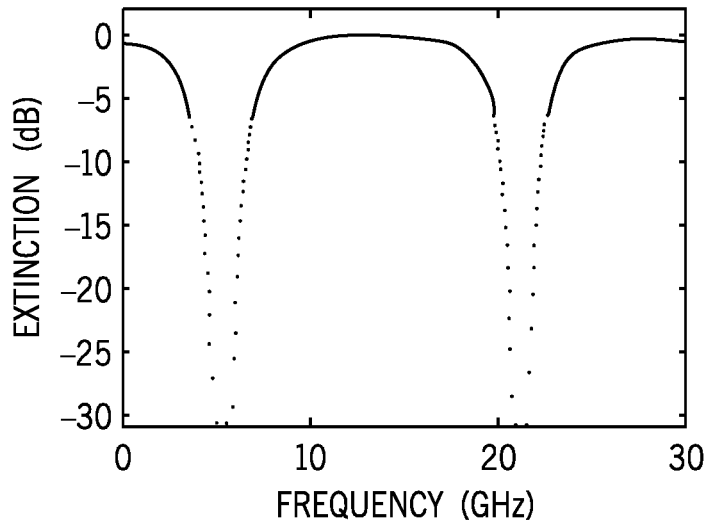
FIG. 10C is a graph showing measured extinction profiles using three reflections from an etalon, in accordance with aspects of the present disclosure.

By way of example, FIGS. 10A-10C depicts experimental data obtained with a notch filter, as described with reference to FIGS. 8A and 8B, having 1, 2 and 3 reflections of an incident beam of light. While greater than 10 dB extinction can be achieved a single reflection (FIG. 10A), about 30 dB may be realized when 3 reflections are used (FIG. 10C). With an incident angle of approximately 0.6 degrees with respect to the normal to a reflecting surface of the etalon, FIGS. 10A-10C demonstrate improved extension with multiple reflections.

Figure 11:
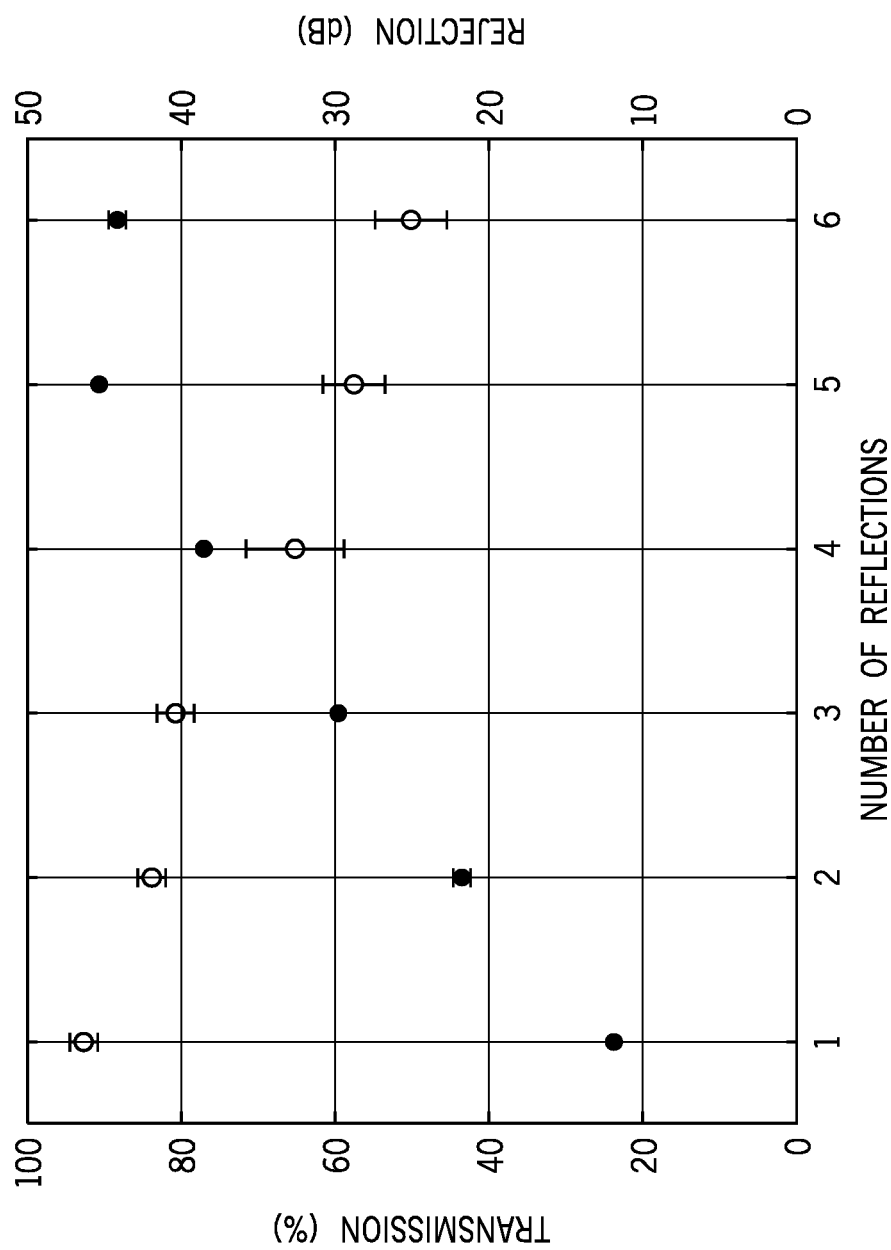
FIG. 11 is a graph showing total transmission rate (red marker), extinction rate (black marker) of the notch filter, in accordance with aspects of the present disclosure, as a function of the number of reflections.

By way of example, FIG. 11 illustrates overall transmission and laser line rejection ratio measured using the notch filter in accordance with the present disclosure. With an increased number of reflections from 1 to 5, the rejection ratio was increased to greater than 40 dB, and the overall transmission rate was better than 50%.

As another example, FIGS. 12A-F and 13A-F illustrate numerical simulation results illustrating working principles of filters, in accordance with the present disclosure. Etalon parameters, as described with reference to FIGS. 3A-3D were used as the frequency-locking/clean-up filter and the notch filter. The Brillouin signal was set at about 50 dB lower than the laser line.

Figure 12A:
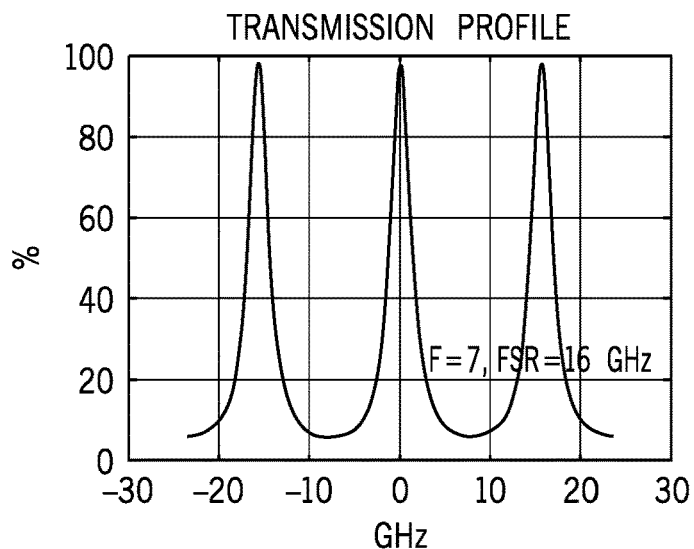
FIG. 12A is a graph showing a transmission profile of a filter in a simulation, in accordance with aspects of the present disclosure.
Figure 12B:
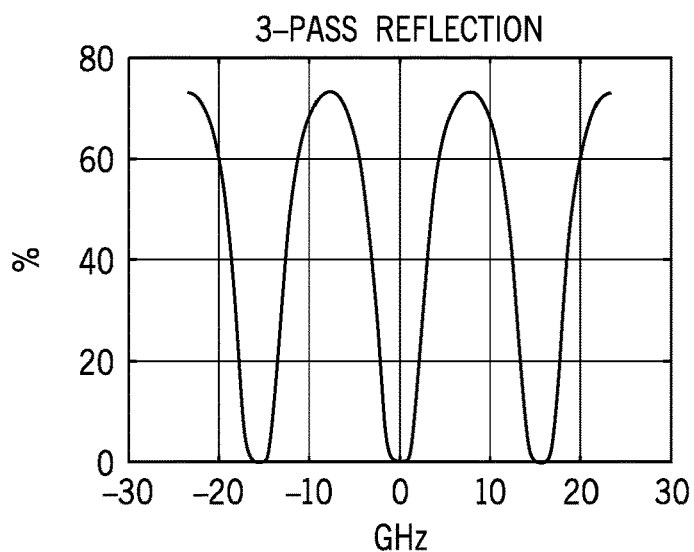
FIG. 12B is a graph showing a reflection profile of a three-pass filter in the simulation of FIG. 12A, in accordance with aspects of the present disclosure.
Figure 12C:
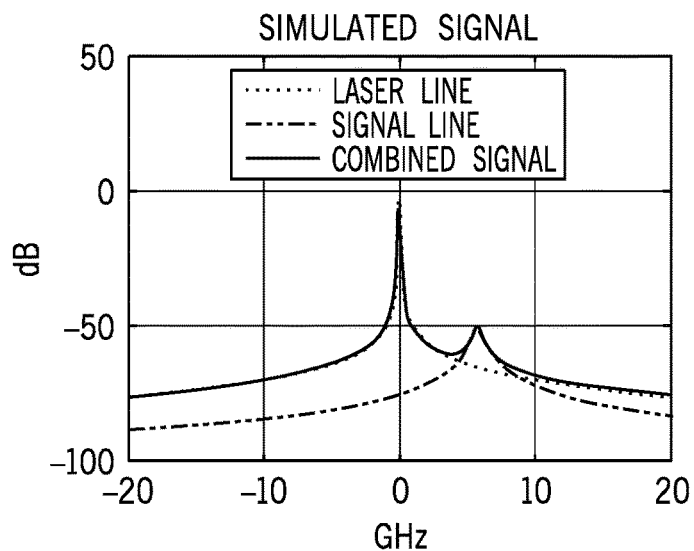
FIG. 12C is a graph showing simulated signals in the simulation of FIG. 12A, in accordance with aspects of the present disclosure.
Figure 12D:
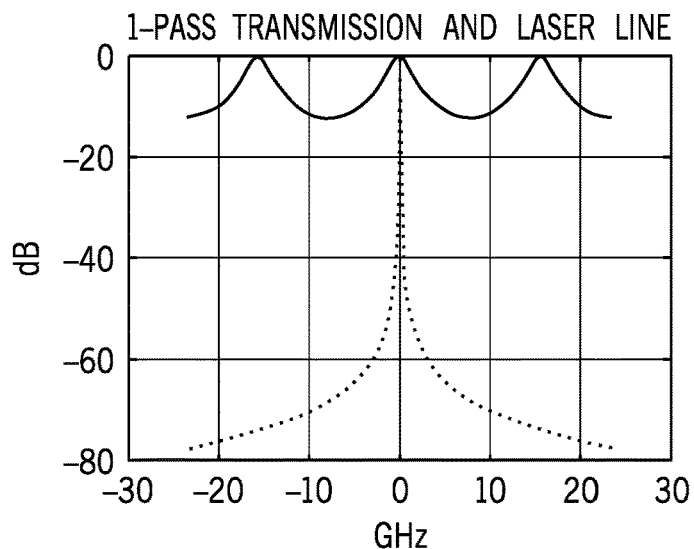
FIG. 12D is a graph showing a one-pass transmission of the laser line with frequency-locking clean-up filter in the simulation of FIG. 12A, in accordance with aspects of the present disclosure.
Figure 12E:
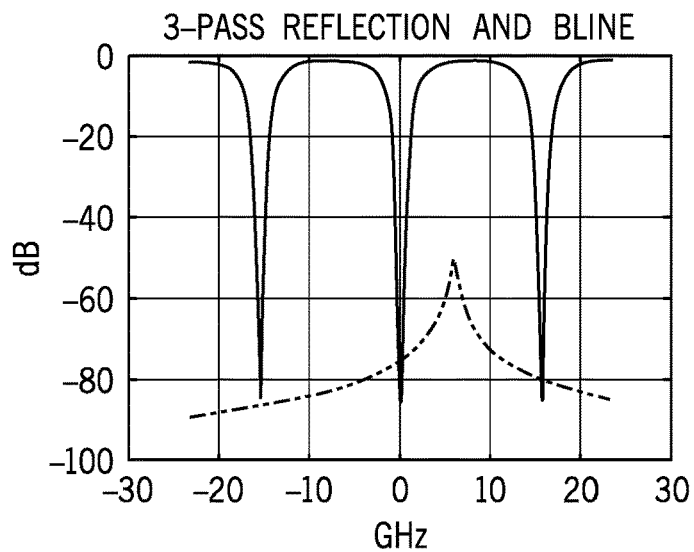
FIG. 12E is a graph showing a three-pass reflection-bandstop filter for background cleaning in the simulation of FIG. 12, in accordance with aspects of the present disclosure.
Figure 13A:
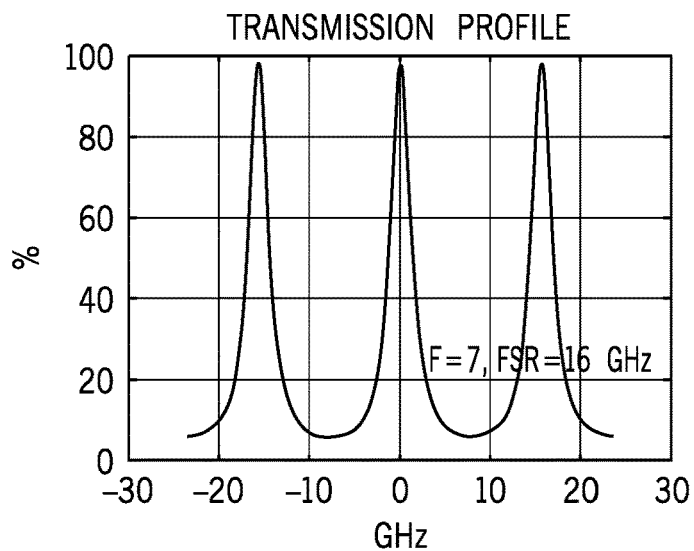
FIG. 13A is a graph showing a transmission profile of a filter in another simulation, in accordance with aspects of the present disclosure.
Figure 13B:
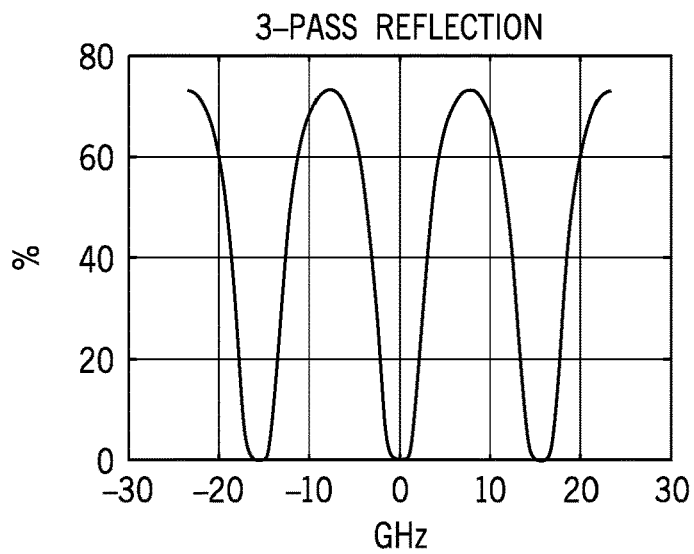
FIG. 13B is a graph showing a reflection profile of a three-pass filter in the simulation of FIG. 13A, in accordance with aspects of the present disclosure.
Figure 13C:
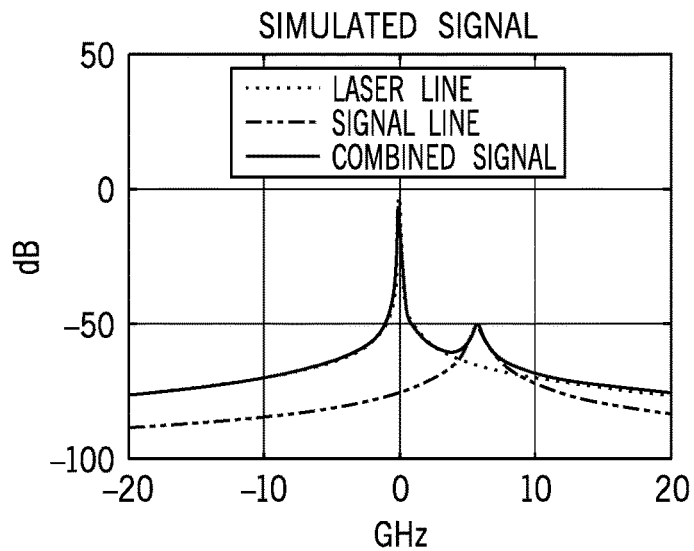
FIG. 13C is a graph showing simulated signals in the simulation of FIG. 13A, in accordance with aspects of the present disclosure.

After a notch filter was carefully aligned, laser output was locked to match the notch with the transmission profile of an etalon (FIGS. 12A, 13A), as described. The bandpass clean-up filter shares the same FSR with the notch filter (FIG. 12B, 13B). The simulated signal is shown in FIGS. 12C and 13C. The combined signal (green line) detected is a combination of the laser line (blue dots) and the signal line (red dashed marker). The relationship between the laser line and the transmission/cleanup filter, and between the reflection profile and Brillouin signal are illustrated in FIGS. 12D, 13D, and 12E and 13E, respectively.

Figure 12F:
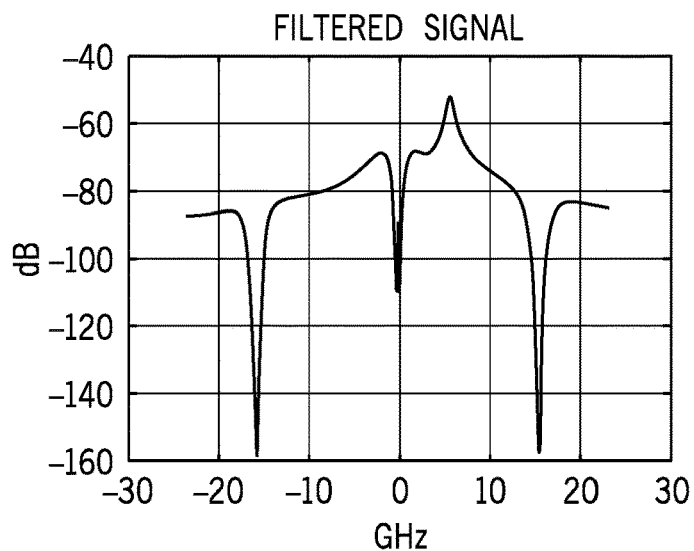
FIG. 12F is a graph showing a filtered signal in the simulation of FIG. 12, in accordance with aspects of the present disclosure.
Figure 13D:
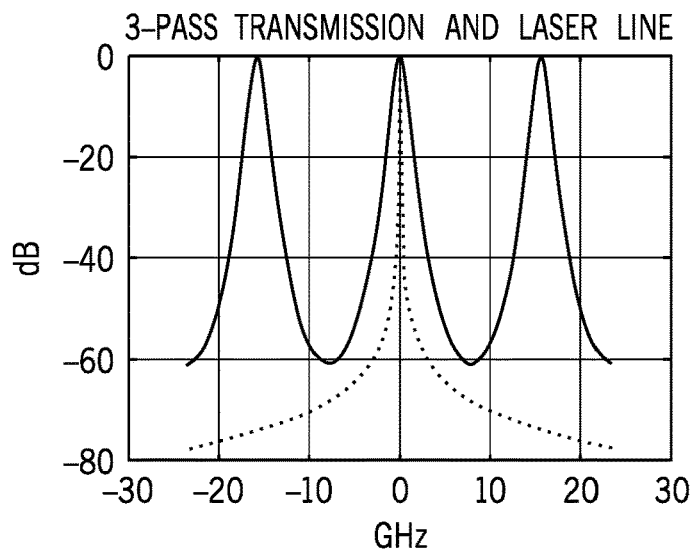
FIG. 13D is a graph showing a one-pass transmission of the laser line with frequency-locking clean-up filter in the simulation of FIG. 13A, in accordance with aspects of the present disclosure.
Figure 13E:
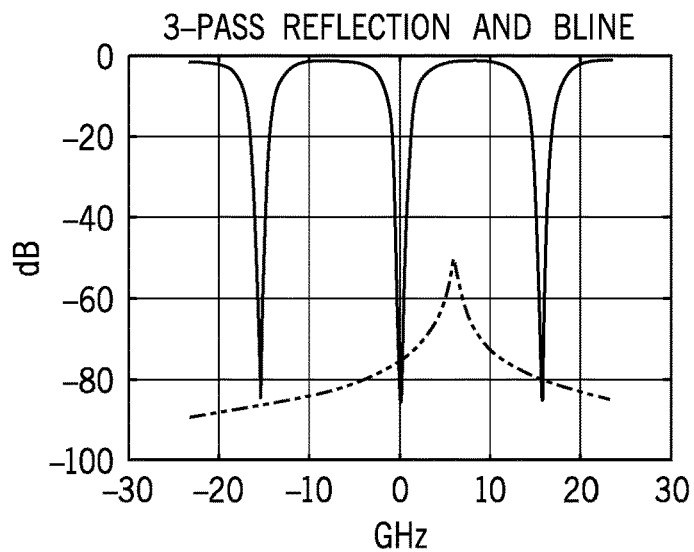
FIG. 13E is a graph showing a three-pass reflection-bandstop filter for background cleaning in the simulation of FIG. 13A, in accordance with aspects of the present disclosure.
Figure 13F:
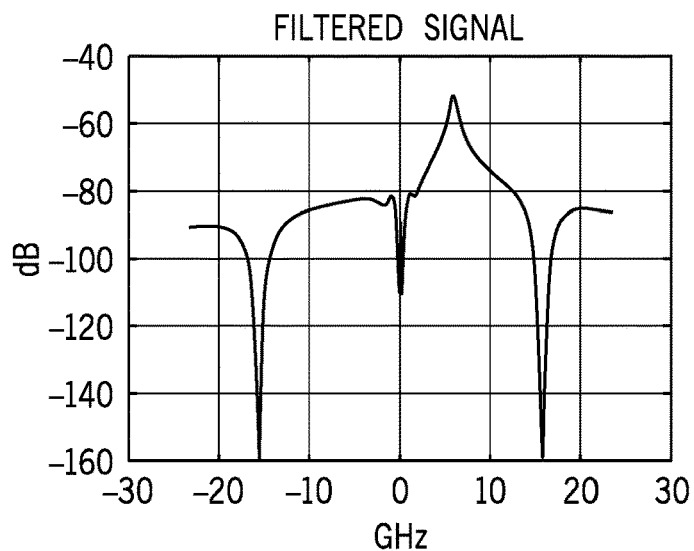
FIG. 13F is a graph showing a filtered signal in the simulation of FIG. 13A, in accordance with aspects of the present disclosure.

As shown in FIGS. 12F and 13F, the signal line is maintained in the signal whereas the laser line is suppressed in the final resulting spectrum. One can also use a single and multiple-transmission configuration of the frequency-locking filter, as depicted in FIGS. 12D and 13D, respectively. FIG. 12F and FIG. 13F show the filter results with 1- and 3-pass transmission when the desired signal is 50 dB lower than the background laser line. A 3-transmission plus 3-reflection notch filter provides around 120-dB rejection and leads to a 20 dB signal-to-background ratio ("SBR") in the filtered spectrum, illustrating that further suppression of the ASE component in the laser spectrum allows the SBR to be further improved.

Figure 14:
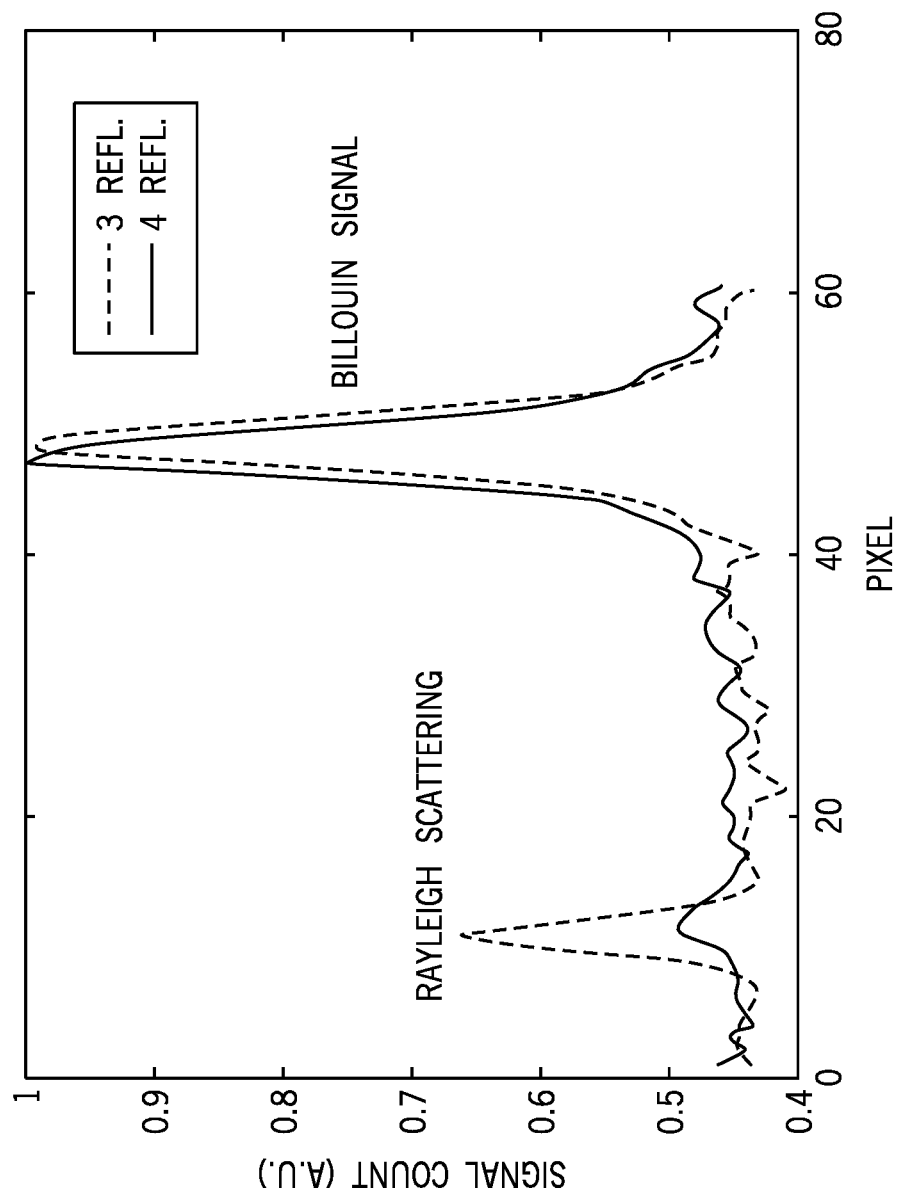
FIG. 14 is a graph showing a measured spectrum of a Brillouin scattering signal from a methyl methacrylate (PMMA) sample, in accordance with aspects of the present disclosure.

By way of example, FIG. 14 shows a spectrum of a Brillouin scattering signal from a polymethyl methacrylate ("PMMA") sample, measured using an system as described with reference to FIG. 2D. As described, the laser frequency was using a bandpass filter based on an etalon. The acquires signal was passed through a notch filter, and integrated to the imaging system, before entering a 2-stage virtually imaged phased array (VIPA)-based spectrometer. In this configuration, the frequency-locking etalon (first filter 274 in FIG. 2D) was tilted at a small angle to match the transmission peak to the stopband of the notch filter (second filter 292 in FIG. 2D). Therefore the laser line is suppressed. As appreciated from FIG. 14, a suppression of the Rayleigh scattering signal was achieved using 3 and 4 reflections.

Figure 15B:
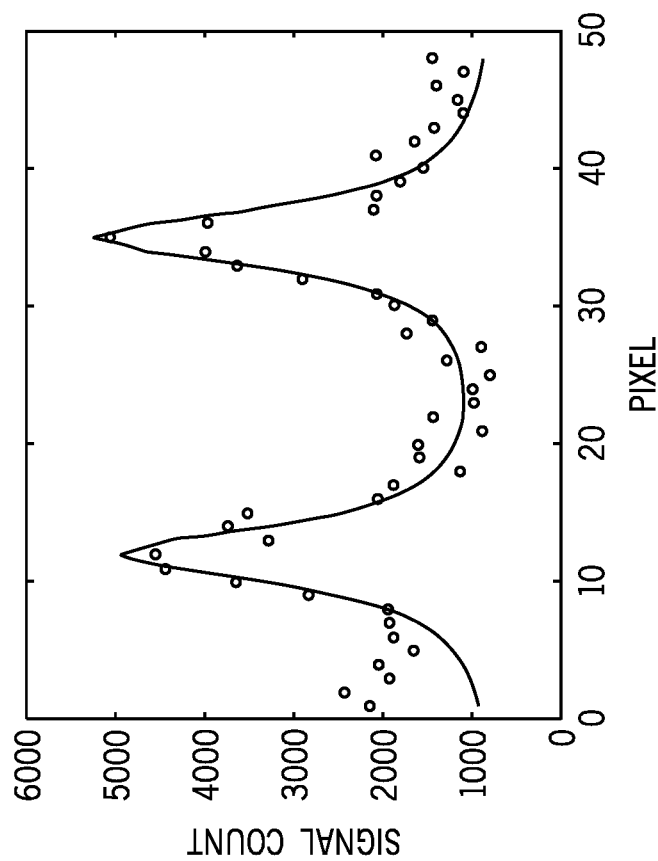
FIG. 15B is a graph showing signal count for the optical signals measured in FIG. 15A.
Figure 15A:
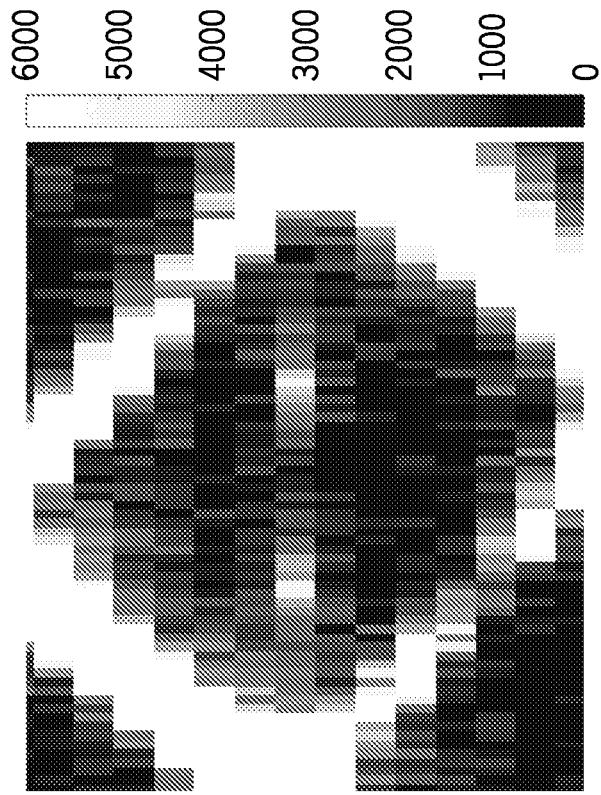
FIG. 15A is an image showing optical signals recorded from a human sclera using a system, in accordance with aspects of the present disclosure.

Using a system as described above, recordings of signals from a human sclera are shown in FIGS. 15A and 15B. In particular, an external diode laser with 780 nm center wavelength and 80 mW output was employed as the optical source. A frequency-locking filter and the notch filter, as described, were used. Light was delivered to a sample arm, and hit the sample. The collected back-scattering signal was coupled into a single mode fiber, passed through a multiple-reflection notch filter (5 reflections), and then directed to a 2-stage VIPA spectrometer. An EMCCD was used for data recording. An active frequency-locking was utilized as described above. The Brillouin scattered signal was clearly observed albeit with residual elastic scattering noise. With curve fitting with a Lorentzien function, Brillouin frequency shifts were determined. Imaging of turbid biological tissue with strong scattering is challenging because of strong elastic scattering in the back-scattered signal. The notch filter with an extinction ratio of 40 dB enabled sclera Brillouin spectroscopy and Brillouin imaging of turbid tissues.

Figure 16C:
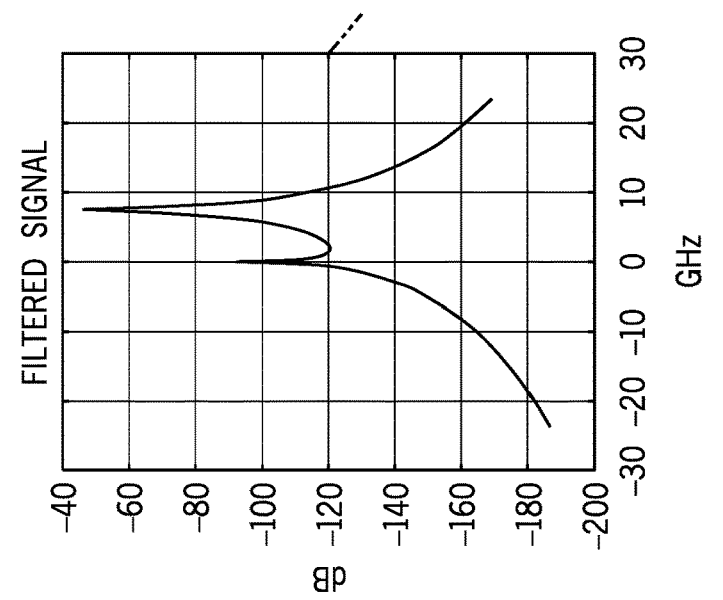
FIG. 16C is a graph showing a filtered signal in the simulation of FIG. 16A, in accordance with aspects of the present disclosure.
Figure 16B:
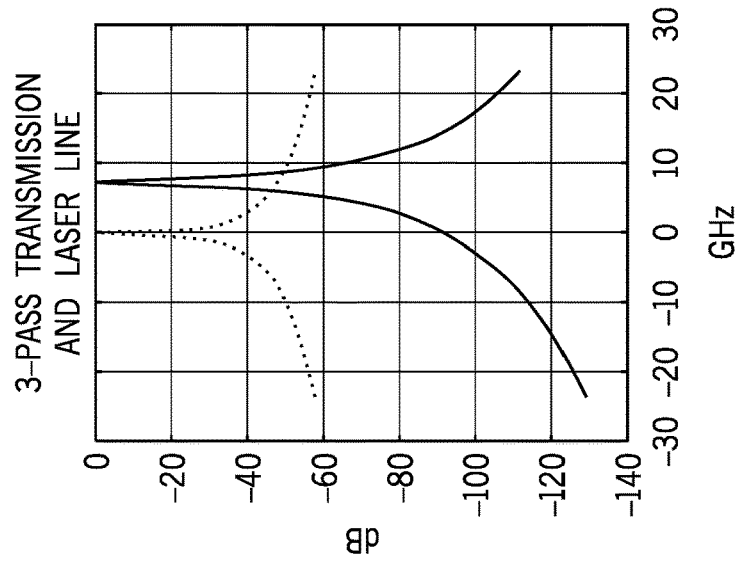
FIG. 16B is a graph showing a three-pass transmission and laser line in the simulation of FIG. 16A, in accordance with aspects of the present disclosure.
Figure 16A:
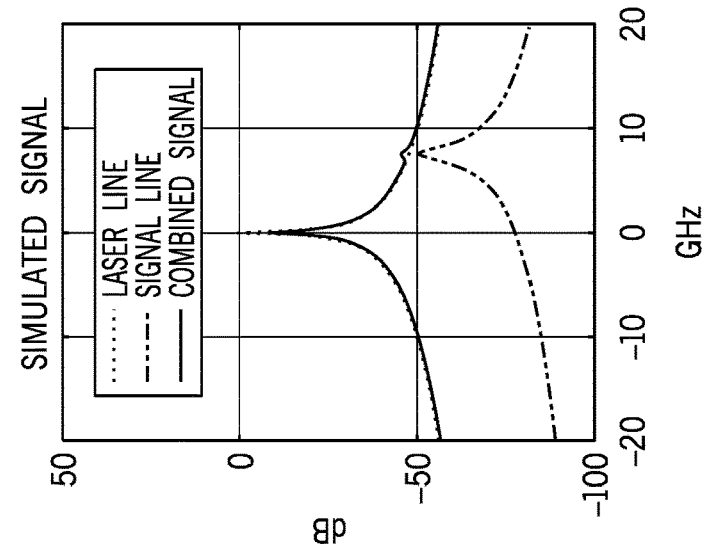
FIG. 16A is a graph showing signals in a simulation for achieving background suppression using a system, in accordance with aspects of the present disclosure.
Figure 17C:
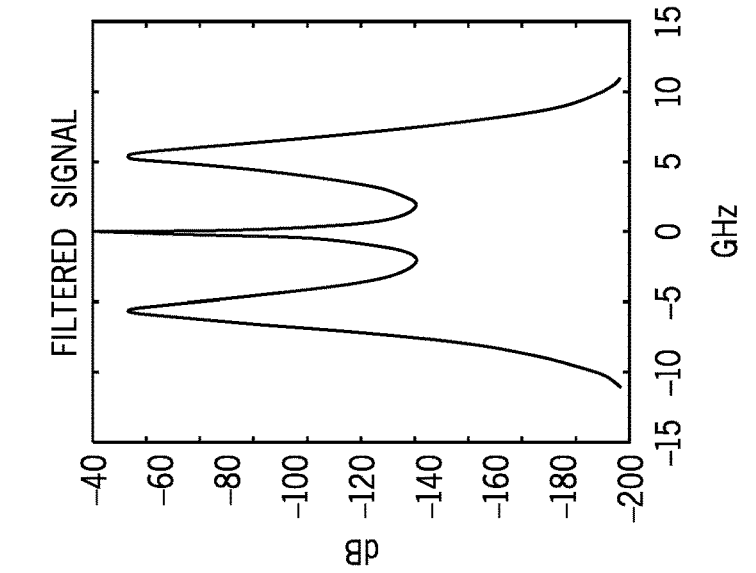
FIG. 17C is a graph showing a filtered signal in the simulation of FIG. 17A, in accordance with aspects of the present disclosure.
Figure 17B:
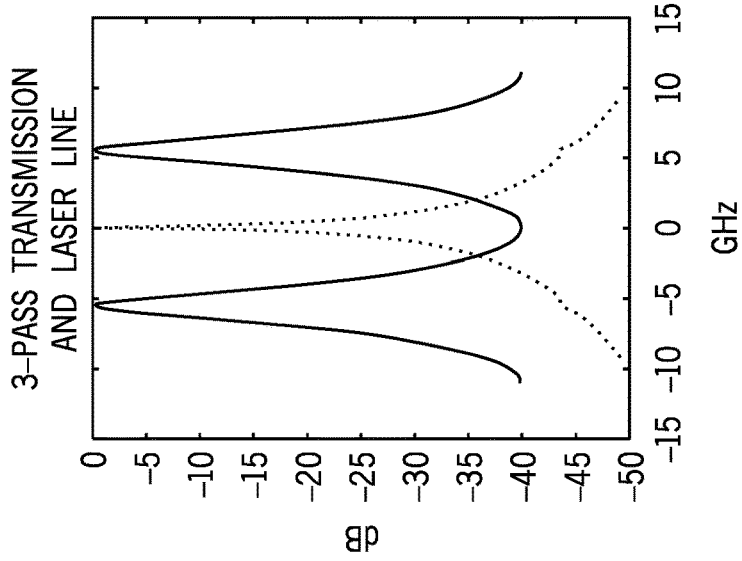
FIG. 17B is a graph showing a three-pass transmission and laser line in the simulation of FIG. 17A, in accordance with aspects of the present disclosure.
Figure 17A:
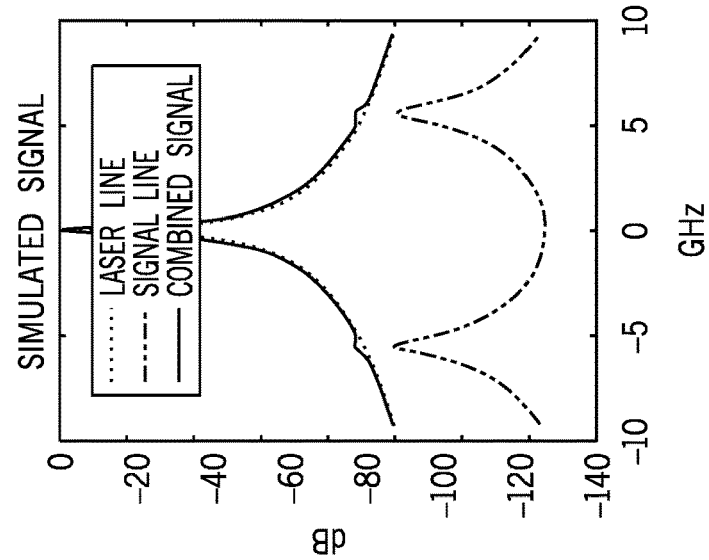
FIG. 17A is a graph showing signals in another simulation for achieving background suppression using a system, in accordance with aspects of the present disclosure.

As a further example, FIGS. 16A-C and 17A-C show simulations of multiple-transmission bandpass filters according to the present disclosure. A configuration as described with reference to FIG. 2B was used. While the output laser frequency was locked to the transmission peak of the clean-up filter (FIG. 16A), the pass band of the bandpass filter was tuned to overlap with the line of interest (FIG. 16B), which was approximately 7.5 GHz away from the laser line. Multiple passes (3 passes in this example) enabled high transmission extinction (FIG. 16C). In this example, the laser line signal was suppressed by around 90 dB. The desired SBR was increased to nearly 30 dB. This configuration allowed one of the Stoke's and anti-Stokes peaks of the Brillouin scattering signal to be picked up. In some implementations, one may desire to simultaneously record both Stoke's and anti-Stokes peaks. This can be realized by using two transmission peaks of a single etalon, as shown in FIGS. 17A-17C.

Other results were also achieved that demonstrate various aspects of the techniques described herein. For example, using the setup, Brillouin imaging of fresh porcine eyeballs was performed. The Brillouin scattering signal was obtained from a depth range of about 100 to 200 µm below the tissue surface or epithelium. The laser power was about 5 mW on the sample surface. In humans, the maximum exposure level for the sclera and conjunctiva is higher than that for the cornea because the risk of retinal damage is not applied. The light scattering coefficients of the conjunctiva are known to be similar to those of chicken breast tissues, and the light scattering from the sclera is about 10 times stronger than the scattering from the conjunctiva. Different EM-CCD integration times of 1, 2, and 4 s were used for the cornea, conjunctiva, and sclera, respectively, to compensate for the reduced signal strength proportional to the amount of light scattering. The conjunctiva tissues showed significantly higher Brillouin shifts than the cornea, and the sclera exhibited much higher Brillouin shifts. The typical ranges of the reported Young's moduli of porcine tissues are about 1-4 MPa of scleral tissues, much higher than about 0.1 to 0.5 MPa for corneas. At an optical wavelength of 780 nm, the typical Brillouin frequency shifts from the sclera were about 6.1 to 6.5 GHz, which was statistically significantly different from the Brillouin shifts of approximately 5.4 GHz for the cornea and approximately 5.6 GHz for the conjunctiva. The wavelength of the optical source may be selected based on various characteristics that may be desired in different situations. For example, a longer wavelength may provide greater penetration for some target tissues. In some embodiments, the wavelength of the optical source is between about 750 nm and 1500 nm.

Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A system for performing spectroscopy on a target, the system comprising:
   an optical assembly comprising:
   an optical source configured to generate light at one or more frequencies to be directed to a target;
   at least one optical filter configured to select desired light signals coming from the target, wherein the at least one optical filter comprises an etalon and at least one reflecting surface external to the etalon, the at least one reflecting surface being configured to redirect to the etalon, at least once, an incident beam reflected from the etalon; and
   a virtually imaged phased array coupled to the at least one optical filter.

2. The system of claim 1, wherein the at least one optical filter comprises a notch filter.

3. The system of claim 1, wherein the optical source comprises a diode laser or a semiconductor laser.

4. The system of claim 1, wherein the virtually imaged phased array is coupled to an imager configured to detect the desired light signals.

5. The system of claim 1, wherein the system further comprises another filter, positioned between the optical source and the target, and configured to reduce a noise background in the light generated by the optical source.

6. The system of claim 5, wherein the another filter is a bandpass filter comprising another etalon and at least one other reflecting surface external to the etalon, the at least one other reflecting surface being configured to redirect to the another etalon, at least once, a beam transmitted through the another etalon.

7. The system of claim 6, wherein the bandpass filter comprises a plurality of etalons.

8. The system of claim 6, wherein the system further comprises a computer configured to control at least the optical source.

9. The system of claim 8, wherein the computer is further figured to adapt an output of the optical source to match a frequency of the bandpass filter.

10. The system of claim 8, wherein the computer is further configured to tune the at least one optical filter using by controlling an orientation of the etalon relative to the incident beam or by controlling a temperature sampled by the etalon.

11. The system of claim 10, wherein the system further comprises an enclosure configured to adapt the temperature over a range approximately between 20C and 50C.

12. The system of claim 1, wherein the at least one optical filter is configured to provide an extinction of undesired light signals at a level of at least 30 dB.

13. The system of claim 12, wherein the desired light signals and undesired light signals are separated by a wavelength of approximately 1 nanometer or less.

14. The system of claim 1, wherein the etalon has a finesse of less than about 20, and the at least one reflecting surface is configured to redirect to the etalon at least 3 different incident beams reflected from the etalon.

15. The system of claim 14, wherein the etalon has a finesse of more than about 5, and the at least one reflecting surface is configured to redirect to the etalon at most 5 different incident beams reflected from the etalon.

16. The system of claim 1, wherein the optical source is coupled to a bandpass filter that has a free spectral range that is based at least in part on a free spectral range of the etalon.

17. An apparatus comprising:
   an optical filter configured to select separate light signals from an incident beam, wherein the optical filter comprises an etalon and at least one reflecting surface external to the etalon, the at least one reflecting surface being configured to redirect to the etalon, at least once, a reflected beam from the etalon; and a virtually imaged phased array coupled to the optical filter.

18. The apparatus of claim 17 further comprising another etalon configured to redirect to the etalon the reflected beam.

* * * * *

UNITED STATES PATENT AND TRADEMARK OFFICE
CERTIFICATE OF CORRECTION

PATENT NO. : 11,333,551 B2
APPLICATION NO. : 16/077189
DATED : May 17, 2022
INVENTOR(S) : Seok-Hyun Yun et al.

It is certified that error appears in the above-identified patent and that said Letters Patent is hereby corrected as shown below:

In the Specification

Column 6, Line 34, "4md/λ" should be --4πnd/λ--.

Signed and Sealed this
Fifth Day of July, 2022

Katherine Kelly Vidal
*Director of the United States Patent and Trademark Office*